(12) United States Patent
Li et al.

(10) Patent No.: US 8,778,135 B2
(45) Date of Patent: Jul. 15, 2014

(54) CIRCULAR UTILIZATION METHOD IN PULPING AND PAPERMAKING PROCESSES WITH STRAW

(75) Inventors: Hongfa Li, Shandong (CN); Mingxin Song, Shandong (CN); Songtao Chen, Shandong (CN); Jihui Yang, Shandong (CN); Liangjin Guo, Shandong (CN)

(73) Assignee: Shandong Tralin Paper Co., Ltd., Shandong (CN)

( * ) Notice: Subject to any disclaimer, the term of this patent is extended or adjusted under 35 U.S.C. 154(b) by 0 days.

(21) Appl. No.: 13/581,820
(22) PCT Filed: Mar. 11, 2011
(86) PCT No.: PCT/CN2011/071724
§ 371 (c)(1),
(2), (4) Date: Aug. 30, 2012
(87) PCT Pub. No.: WO2011/113329
PCT Pub. Date: Sep. 22, 2011

(65) Prior Publication Data
US 2012/0325421 A1    Dec. 27, 2012

(30) Foreign Application Priority Data
Mar. 17, 2010 (CN) .......................... 2010 1 0126189

(51) Int. Cl.
| | | |
|---|---|---|
| *D21F 1/66* | (2006.01) | |
| *D21H 11/12* | (2006.01) | |
| *D21C 3/22* | (2006.01) | |
| *D21C 11/02* | (2006.01) | |
| *D21C 11/06* | (2006.01) | |
| *D21C 11/10* | (2006.01) | |
| *C05F 7/02* | (2006.01) | |
| *C05F 17/00* | (2006.01) | |
| *C02F 9/00* | (2006.01) | |
| *C02F 3/30* | (2006.01) | |
| *C02F 1/52* | (2006.01) | |
| *C02F 3/28* | (2006.01) | |
| *C02F 103/28* | (2006.01) | |

(52) U.S. Cl.
CPC .................. *D21H 11/12* (2013.01); *D21C 3/22* (2013.01); *D21C 11/02* (2013.01); *D21C 11/06* (2013.01); *D21C 11/10* (2013.01); *C05F 7/02* (2013.01); *C05F 17/009* (2013.01); *C02F 9/00* (2013.01); *C02F 3/30* (2013.01); *C02F 2303/16* (2013.01); *C02F 1/52* (2013.01); *C02F 3/28* (2013.01); *C02F 2103/28* (2013.01); *Y10S 210/928* (2013.01)
USPC .............. 162/29; 162/30.11; 162/35; 162/36; 162/41; 162/42; 162/60; 162/65; 162/97; 162/189; 162/190; 210/605; 210/617; 210/620; 210/702; 210/807; 210/928; 423/242.1; 423/243.01; 423/243.06; 71/25

(58) Field of Classification Search
CPC .... C02F 1/52; C02F 2103/28; C02F 2303/16; C02F 3/28; C02F 9/00; D21H 11/12; D21H 11/14; D21C 11/0007; D21C 11/02; D21C 11/06; D21C 11/10; D21C 3/22; D21C 9/00; C05F 17/009; C05F 7/02
USPC .......... 162/4, 6, 13, 29, 30.11, 41–42, 60, 65, 162/91, 97, 99, 141, 147–149, 189–190, 162/35–36; 423/242.1, 243.01, 243.06; 210/605, 617, 620, 696, 702, 705, 749, 210/807, 928; 71/1, 25
See application file for complete search history.

(56) References Cited

U.S. PATENT DOCUMENTS 3,984,225 A * 10/1976 Sears et al. ........................ 71/25
4,259,147 A *  3/1981 Gordy .............................. 162/12

(Continued)

FOREIGN PATENT DOCUMENTS

| CN | 1202466 A | 12/1998 |
|---|---|---|
| CN | 1374424 A | 10/2002 |

(Continued)

OTHER PUBLICATIONS

International Search Report (PCT/ISA/210) issued on Jun. 30, 2011, by the Chinese Patent Office as the International Searching Authority for International Application No. PCT/CN2011/071724.

(Continued)

*Primary Examiner* — Jose Fortuna
(74) *Attorney, Agent, or Firm* — Buchanan Ingersoll & Rooney PC

(57) ABSTRACT

A circular utilization method in pulping and papermaking processes with straw Primary pulp is obtained by digesting straw raw material according to the ammonium sulfite method. Concentrated black liquor is extruded from the primary pulp; paper pulp and diluted black liquor. The concentrated black liquor and the diluted black liquor are mixed, and a contaminated condensate is obtained. A residual concentrate or the concentrated black liquor is used for preparing a fertilizer. The contaminated condensate is mixed with one or more of the waste material obtained from stock preparation, a crop byproduct or organic waste, and substrate or fertilizer is obtained by fermenting the nitrogen source of the contaminated condensate or ammonium sulfite, or using the contaminated condensate for desulfurizing flue gas. Ammonia and flue gas are reacted to obtain the ammonium sulfite as a digestion agent; and water from recycling is used in corresponding phases of the pulping process.

16 Claims, 5 Drawing Sheets

(56) References Cited

U.S. PATENT DOCUMENTS

| | | | |
|---|---|---|---|
| 5,059,406 A * | 10/1991 | Sheth et al. | 423/244.08 |
| 6,790,313 B1 | 9/2004 | Sandquist et al. | |
| 6,821,382 B1 | 11/2004 | Lundgren | |
| 7,867,947 B1 * | 1/2011 | Devic et al. | 504/101 |
| 8,088,199 B2 * | 1/2012 | Olsen et al. | 95/107 |
| 8,303,772 B2 * | 11/2012 | Li et al. | 162/148 |
| 8,414,808 B2 * | 4/2013 | Dvorak et al. | 264/109 |
| 8,449,773 B2 * | 5/2013 | Hansen et al. | 210/627 |
| 2002/0148778 A1 * | 10/2002 | Raven | 210/603 |
| 2003/0121851 A1 * | 7/2003 | Lee, Jr. | 210/603 |
| 2005/0274668 A1 * | 12/2005 | Lee, Jr. | 210/603 |
| 2010/0201026 A1 * | 8/2010 | Dvorak et al. | 264/241 |
| 2011/0042307 A1 * | 2/2011 | VanOrnum et al. | 210/603 |
| 2011/0061825 A1 * | 3/2011 | Li et al. | 162/13 |
| 2011/0117619 A1 * | 5/2011 | Hansen et al. | 435/167 |
| 2011/0297343 A1 * | 12/2011 | Li et al. | 162/148 |
| 2012/0325421 A1 * | 12/2012 | Li et al. | 162/189 |
| 2013/0157334 A1 * | 6/2013 | Van Der Heide et al. | 435/164 |

FOREIGN PATENT DOCUMENTS

| | | | |
|---|---|---|---|
| CN | 1379152 A | 11/2002 | |
| CN | 1393284 A | 1/2003 | |
| CN | 1915912 A | 2/2007 | |
| CN | 101451315 A | 6/2009 | |
| CN | 101759449 A | 6/2010 | |
| CN | 101759450 A | 6/2010 | |
| CN | 101759451 A | 6/2010 | |
| CN | 101760975 A | 6/2010 | |
| CN | 101768887 A | 7/2010 | |
| CN | 101781031 A | 7/2010 | |
| CN | 101781057 A | 7/2010 | |
| EP | 2224059 A1 * | 9/2010 | |
| WO | WO 00/01879 A1 | 1/2000 | |
| WO | WO 00/34569 A1 | 6/2000 | |
| WO | WO 2009015555 A1 * | 2/2009 | |
| WO | WO 2009015556 A1 * | 2/2009 | |
| WO | WO 2009056017 A1 * | 5/2009 | |
| WO | WO 2010066195 A1 * | 6/2010 | |
| WO | WO 2011113329 A1 * | 9/2011 | |

OTHER PUBLICATIONS

Zhou Yanling et al., "Tralin Model" Got Rid of Half-century Infamy of Straw Pulp Papermaking, China Environment News/Aug. 19, 2009, Edition 004, pp. 1-7.

Shandong Tralin Paper Co., Ltd., "Tralin Mode" Comprehensive utilization of straw through technical innovation, China Pulp & Paper Industry, Mar. 2010, vol. 31, No. 5, pp. 17-24.

\* cited by examiner

CIRCULAR UTILIZATION METHOD IN PULPING AND PAPERMAKING PROCESSES WITH STRAW

FIELD OF THE INVENTION

The present invention relates to a circular utilization method in pulping and papermaking processes with straw.

BACKGROUND OF THE INVENTION

For papermaking with straw as specified in the prior art, the raw materials used are mainly the straws of plants from annual grass family and mallow family. The applied papermaking process generally consists of straw cutting, screening, dedusting, digestion, washing, screening and cleansing, bleaching, washing, beating and papermaking.

In the prior art, the ammonium sulfite method is used for preparing non-woody fiber raw material pulp. It is characterized by mild digestion, so as to avoid the damage of the strong alkali on fibers, enhance the strength of the pulp, increase the yield, reduce the broken end damages of the papers, and achieve high rate of finished products.

After the straw raw material in question is digested in ammonium sulfite, the cellulose is extracted as the raw material for papermaking. The remaining black liquor can be used as fertilizer. However, since the water content in the digested black liquor of ammonium sulfite is high, the storage and transportation are not convenient.

CN200510086269 discloses a method for preparing commercial organic fertilizer out of waste liquor from pulping and papermaking by the ammonium sulfite method; *Comprehensive Treatment Technology for Papermaking Wastewater by Ammonium Sulfite Method* (*Environment And Sustainable Development*, Page 36 to Page 37, Volume 1, 2006) reports a kind of waste treatment method that separated the papermaking wastewater into digested black liquor, mid-phase water and white water, all of which will be separately treated and utilized, so as to achieve the comprehensive standards. However, during the black liquor evaporation of the method in question, the energy consumption is high, so is the cost. In addition, the ammonium sulfite decomposes during evaporation, so there is a certain content of ammonia in the condensate, which belongs to the ammonia nitrogen pollutant. Therefore, the condensate can not be directly discharged. It is required to additionally treat the condensate, which further increases the cost. Moreover, the non-woody fiber raw material pulp prepared with ammonium sulfite method is hard to bleach. During the bleaching, the dosage of bleacher is increased, which further increases the cost and enlarge the pollution source.

Besides the disadvantages mentioned above, the papermaking with non-woody fiber also has the following disadvantages:

1 The paper pulp fiber is small, low in strength and poor in filtration performance, and the quality of the paper made from the paper pulp fiber has a relatively low quality;
2 The water consumption is as high as 100 $m^3$ to 150 $m^3$ per ton of pulp;
3 There are many small fibers in the black liquor, the content of polysaccharides is high, the interference is taken by Silicon, and the structure of lignin is complex, all of which result in the low concentration of black liquor and difficulties in treatment of black liquor;
4 The discharge of COD and BOD severely exceeds the standards. The discharge of wheat straw pulp COD in China accounts for more than 74% of the total discharge in the entire papermaking industry;
5 In the waste liquid of chlorine bleaching, there are not only the common pollutant factors for water environment such as COD and BOD, but also highly toxic products such as trichloromethane, dichlorophenol, trichlorophenol, and dioxin, chlorofuran, etc.

In conclusion, during the papermaking with straw raw material, the improvement of only individual step can never realize the comprehensive purpose of water conservation, energy conservation, consumption reduction, efficiency increase, and high quality. Only the breakthroughs in the technologies of pulping, papermaking, energy conservation and consumption reduction can achieve the efficient and circular utilization of resources, and realize the goal of sustainable development of papermaking industry.

Therefore, the present invention is filed.

SUMMARY OF THE INVENTION

The main object of the present invention is to provide a circular utilization method in pulping and papermaking processes with straw, which can, by the control of the processes, realize the comprehensive and multiple-cycle utilization of each raw material, intermediate product, waste material, waste liquid, energy, water and products.

In the present invention, the straw refers to the straw of grass plants, comprising one of, or combination of, rice straw, wheat straw, cotton stalk, bagasse, corn stalk, reed and bamboo reed straw; however, the rice straw, wheat straw, and corn stalk are preferred.

In the present invention, the paper pulp prepared by the pulping processes mentioned in the present invention (i.e. digestion, pulp extruding, pulp washing, defibering and oxygen delignification) is called unbleached pulp, which can be used as the pulp for unbleached paper, corrugated paper, lunch box, gelatine printing paper, and food wrapper.

For the unbleached pulp mentioned in the present invention, during preparation, since no bleaching processing other than the oxygen delignification in the prior art (there is a bleaching process called oxygen delignification in the prior art, so it is explained here for distinguishing) is performed, there is neither the contamination of bleachers in the obtained pulp, nor the dioxin and adsorbable organic halides. Meanwhile, the strength of the pulp is protected, and it is avoided the loss and degradation of the cellulose in the pulp due to the influence of bleaching.

The paper pulp mentioned in the present invention refers to the unbleached pulp, which has a fracture length of 5.0-7.5 km, a folding number of 40-90 times, a tearing strength of 230-280 mN, and a whiteness of 35-55% ISO; the pulp with low whiteness has a whiteness of 43-65% ISO, a fracture length of 4.5-7.2 km, a tearing strength of 200-300 mN, a folding number of 30-121 times, and a beating degree of 28-35° SR.

The unbleached pulp has a relatively high strength. Especially, fracture length and folding number of the unbleached pulp have exceeded that of the hardwood pulp. It can be directly used for making newspaper, book paper, and tissue paper, etc. Or, it can be more widely used for making other kinds of papers by adding only a small amount of wood pulp. Therefore, the cost for product is significantly reduced while the strength of product is ensured. The pulp with low whiteness in the present invention can be used for making newspaper, supercalendered paper, wrapping paper, paper diaper, toilet paper, tissue paper, face tissues, napkin, paper towel, kitchen towel, writing paper, offset book paper, gelatine printing paper, single-face writing paper, single-face gelatine printing paper and corrugated paper. It can also be used for making pulp molded products, which include: bowl, basin, cup, barrel, plate, dish, tray and lunch box; bracket, electric welding shield, indoor decorating plate, molded flowerpot, molded seedling growing cup, molded slippers, absorbent pad, and bench hassock in toilet; molded medical tray holder, molded medical care product, and disposable medical vessel.

The object of the present invention can be achieved by the following methods:

The circular utilization method in pulping and papermaking processes with straw mentioned in the present invention comprises the following steps:

(1) Among the raw materials from farm planting, greenhouse planting and garden F, selecting the straw raw material G that is suitable for pulping, obtaining straw raw material for pulping A through stock preparation H, obtaining high hardness pulp B by digestion T, then obtaining pulp O by extruding U and washing V, performing post-treatment X for pulp O to obtain paper pulp Z, and manufacturing paper product W with pulp O;

(2) In step (1), obtaining waste I after stock preparation, mixing waste I with contaminated condensate Q, obtaining substrate K by fermentation J, then returning the formed substrate K to farm planting, greenhouse planting and garden F for utilization, which can result in the circular availability of straw raw material G;

(3) Extracting black liquor C from washed high hardness pulp B by extruding U and washing V, and obtaining concentrated black liquor D by evaporation and concentration P, which can be used as fertilizer E for circularly returning to farm planting, greenhouse planting and garden F for utilization;

(4) With the help of flue gas desulfurization R, generating ammonium sulfite S by mixing contaminated condensate Q obtained from evaporation and concentration P process of the obtained black liquor C after washing, and using the ammonium sulfite S in digestion T circularly;

(5) Using the recycled water from the mid-phase water processing to corresponding phases in the whole pulping process.

On the basis of the above mentioned circulation, M (crop byproduct) from farm planting, greenhouse planting and garden F and/or organic waste L from other aspects are put into step (2) of the circulation, contaminated condensate Q is mixed, substrate or fertilizer K is obtained by the method of fermentation J, and the substrate or fertilizer K is returned to farm planting, greenhouse planting and garden F to form the circulation.

The contaminated condensate or the ammonium sulfite obtained by absorbing flue gas is mixed with crop byproduct or organic waste, the ratio of mass percentage of carbon to mass percentage of nitrogen in the mixture is adjusted to be 15~30:1 to obtain the mixture before fermentation. The pH value of the mixture before fermentation is 9.5~10. Spontaneous fermentation for the obtained mixture before fermentation is performed to get the fermented mixture. When the ratio of mass percentage of carbon to mass percentage of nitrogen in the obtained fermented mixture is within the range of 15~30:1, and the pH is within the range of 6.5~8.5, the fermentation is completed and the substrate is obtained.

In fact, meanwhile the present invention makes full use of the wastes other than the pulp consumed by the circulation technology, it is also required to add large amount of raw materials needed by the process, so as to make up the shortages of various raw materials during circulation. For example, most of the straw raw materials are the raw materials outside the circulation, and most of the ammonium sulfite is from other sources other than the circulation.

During mid-phase water processing, the coagulant aids are added into the wastewater after the UPCB adsorption filtration layer. The additive amount of coagulant aids is taken as 0.2-5 ppm of the total weight of the wastewater. The filtration is micro-filtration, with the number of meshes being 80-120.

The mid-phase water processing also includes the steps of filtration, sand riffling, flocculation settling, the separation and recycling. The flocculants are added into the recycling water to be processed before flocculation settling. Desalination is performed for 70-90% of total amount of the flocculants (by weight). In the flocculation settling step, at first, 10-30% of total amount of flocculants (by weight) are added into the recycling water to initiate the flocculation settling in recycling water. The dosing point GT is controlled in the range of $10^6$-$10^8$, and the time for hybrid reaction is 2-8 minutes. Then the floc which is desalinated and retextured is added to continue the flocculation settling. GT is controlled in the range of $10^5$-$10^6$, and the time for hybrid reaction is 5-15 minutes. After flocculation settling, it is permitted to add coagulant aids into recycling water, and the amount of the coagulant aids is 1-6 ppm of the weight of the recycling water to be processed.

To be specific, the method in the present invention comprises the following steps:

1. Raw Material and Waste Obtained from Stock Preparation

In the present invention, the raw material obtained by dry stock preparation method can be directly digested, or steeped in the organ of Corti for steeping after stock preparation and before digestion.

During pre-steeping, the liquor ratio is 1:2-4, and the temperature of the steeping liquor is 85-95° C. As a result, the steeping liquor can fully contact the raw materials, which will result the even steeping of the raw materials.

The steeping liquor may be an aqueous alkali with a certain concentration, such as an aqueous alkali with an alkali amount being 2-4% of that of absolutely dry raw materials (in sodium hydroxide), or a mixed liquor of alkali and black liquor, with the concentration of black liquor being 11-14° Be'(20° C.).

The raw material is steeped in the black liquor as the waste liquor, which realizes the recycling of the black liquor, reduces the pressure of environmental processing of black liquor, and meanwhile provides the thorough chemical reaction conditions for the raw material in digestion.

2. Digestion of Raw Material

The batch-type spherical digester, continuous digester, or vertical digester can be adopted for digestion mentioned in the present invention. The details are as follows:

1) When digestion is performed by ammonium sulfite method in batch-type spherical digester or continuous digester:

① Liquid chemical for digestion is added into the straw raw material, with the amount of ammonium sulfite being 9-13% of that of absolutely dry raw materials, and the liquor ratio being 1:2-4;

② The steam is supplied for heating to the temperature of 165-172° C. The block time for temperature rise, relief and thermal insulation is 160-210 minutes for spherical digester, and 30-40 minutes for continuous digester.

2) When digestion is performed by ammonium sulfite method in vertical digester:

① Liquid chemical for digestion is added into the straw raw material for pulping that is obtained by the stock preparation, with the amount of ammonium sulfite being 9-15% of that of absolutely dry raw materials, and the liquor ratio being 1:6-10;

②The straw raw material for pulping is delivered into the digester via the black liquor. When the digester is fully filled, the cover is closed. The chemical for digestion with a temperature of 130-145° C. is added into the digester. Meanwhile, the air in the digester is expelled and the pressure is increased to 0.6-0.75 MPa, and the temperature of the liquid chemical for digestion is increased to 156-173° C. The temperature rise, thermal insulation, and replacement are performed, and finally a pump is used to discharge the pulp into the blow tank, with the block time being 220-360 minutes.

For the digestion process adopting the ammonium sulfite method in the present invention, after the digestion of the grass plants, a high hardness pulp with a K value of 16-28 (equivalent to a Kappa number of 24-50) is obtained.

Compared with the digestion method of the prior art, the digestion method of the present invention, to a large extent, protects the constituents of the raw material of grass plants needed for pulping, meanwhile shortens the thermal insulation time significantly, reduces the energy consumption significantly, and improves the pulping yield significantly, with 50-68% for primary pulp. As a result, the production efficiency is improved significantly.

The digestion by ammonium sulfite method of the present invention includes alkaline ammonium sulfite method, neutral ammonium sulfite method and acid ammonium sulfite method.

The digestion is preferred to be performed by alkaline ammonium sulfite method. If so, the concentration can be directly performed.

However, if the digestion is performed by neutral ammonium sulfite method and acid ammonium sulfite method, adequate amount of alkali shall be added to convert the ammonium sulfite into sulfite before concentration is performed in the black liquor. The alkali refers to one of, or combination of, sodium hydroxide, calcium hydroxide, potassium hydroxide, or sodium bicarbonate, etc.

3. Extruding

The extruding of the method in the present invention refers to supplying the high hardness pulp with a concentration of 8-15% at the entrance of the pulp extruder, then extruding the black liquor by extrusion force to obtain an extruded pulp with a concentration of 18-30%.

The extruding can be performed by the pulp extruders which is used to extract the black liquor in the prior art. The preferred extruder is reducing single-screw pulp extruder, double-screw pulp extruder, or double-roller pulp extruder. During extruding by pulp extruder, since very large extrusion force will be generated so as to facilitate the defibration, devillicate, brooming, and conquassation, the primary walls are damaged, the fibers absorb sufficient energy to generate very large stress within the fibers, and the reaction performance of the high hardness pulp will be significantly improved. Meanwhile, the fibers undergo the fibrillation; the organic matters on the epidermis and the impurities among the fibers dissolve into the digested black liquor, and then are discharged from the outlet flume. Therefore, the fiber concentration is significantly improved. Some ashes and impurities in the black liquor will also be discharged with the black liquor, which facilitate the full preparation for the next step of the process. What's more, the change of beating degree of the high hardness pulp is very small before and after extruding, i.e. the damage to the cellulose is small, which can maintain the inherent lengths of the grass fibers relatively well and minimize the damage to the fibers.

4. Pulp Washing and Black Liquor Recycling

The washing of the present invention refers to one or more displacement washings of the extruded pulp by one of, or combination of, the black liquor with a temperature of 60-80° C., a concentration of 3-6.2° Be, and a pH value of 8-8.3, or fresh water with a temperature of 70-80° C.

The washing is performed in vacuum pulp washer, pressure pulp washer or horizontal belt pulp washer.

The difference from the prior art is that the washing in the present invention is for a high hardness pulp with a K value of 16-28 (equivalent to a Kappa number of 24-50). Since the hardness of this kind of pulp is very high, it is easier to wash off the ashes and impurities, so as to maintain the pulp in a very high degree of cleanness.

The black liquor can be reused for the digestion in Step 2.

5. Oxygen Delignification

The post-treatment mentioned in the present invention includes defibering, oxygen delignification, purification and screening. The obtained paper pulp, which is used for making paper products, is called unbleached pulp. The preferred bleaching does not include the traditional non-woody fiber pulping.

The defibering includes the treatment of the washed pulp by deflaker, kneading machine, disc crusher, disc grinder in the beating machine, or defibrator, so as to loosen the fiber structures.

The oxygen delignification refers to removing the lignin in the pulp by using sodium hydroxide and oxygen, which includes:

1) Adjusting the concentration of the high hardness pulp, which is obtained after digestion, to 8-18%, i.e. the oxygen delignification is performed in the median concentration conditions;

2) Pumping the pulp into the reaction tower for oxygen delignification, and adding sodium hydroxide and oxygen; and 3) Starting the delignification reaction in the reaction tower for oxygen delignification, and then obtaining a pulp with a K value of 10-14 (equivalent to a Kappa number of 13-19.8).

Preferably, the hardness of the pulp obtained after oxygen delignification in Step 3) is the one with a Kappa number of 14.5-17.7.

In the present invention, controlling the hardness of the pulp obtained after oxygen delignification is to ensure the removal of maximum amount of lignin on the one hand, and to ensure the hardness of the obtained pulp on the other hand. Similarly, the method for oxygen delignification can be any method in the prior art, as long as the hardness of the pulp after controlled treatment is within the range specified in the present invention.

The oxygen delignification can be single-tower/double-tower oxygen delignification. For multi-stage oxygen delignification, the degradation influence of the single-tower/double-tower oxygen delignification being used in the present invention is relatively small.

During oxygen delignification, the pulp has a temperature of 95-100° C. and pressure of 0.9-1.2 MPa at the inlet of the reaction tower, and a temperature of 100-105° C. and pressure of 0.2-0.6 MPa at the outlet. During the oxygen delignification, the alkali amount is 2-4% of the absolutely dry pulp (in sodium hydroxide), and the oxygen amount is 20-40 kg per ton of pulp. The reaction time of the pulp within the reaction tower is 60-150 minutes.

During oxygen delignification in the present invention, the delignification rate is 35-70%.

During the oxygen delignification mentioned in the present invention, the magnesium salt is used as protective agent, the amount of which is 0.2-1.2% of the absolutely dry pulp. Meanwhile, $H_2O_2$ can be added as the enhancer.

6. Concentration of Black Liquor

The contaminated condensate in the present invention includes mildly contaminated condensate and/or seriously contaminated condensate.

The $NH_4^+$—N concentration of the mildly contaminated condensate is larger than 0 and smaller than 1,000 mg/l.

The $NH_4^+$—N concentration of the seriously contaminated condensate is 4,000 mg/l~5,000 mg/l, preferably, 4,000 mg/l~4,500 mg/l. The seriously contaminated condensate is preferred. The temperature of the contaminated condensate is 25~70° C., preferably, 50~70° C.

In the practical process of a specific industrial production, the $NH_4^+$—N concentration of the seriously contaminated condensate varies a lot. The purpose of the present invention is to comprehensively adjust the entire treatment process. How to realize the circulation on basis of meeting the basic requirements of papermaking is the feature of the present invention. Therefore, even the $NH_4^+$—N concentration of the seriously contaminated condensate is not within the scope disclosed in the present invention, as long as the substantive technical scheme mentioned in the present invention is used, it shall be deemed as within the protection scope of the present invention.

7. Fertilizer Preparation

In the present invention, the concentrated black liquor, which is obtained by evaporation and concentration of pulping black liquor, can be directly used for preparing organic fertilizer. The researchers of the present invention also found that pulping by the method of the present invention can reduce the damage to the cellulose, and the content of fulvic acid in the residual liquid after digestion is relatively high. The content of fulvic acid in the solid content of the black liquor is 10-20%.

While the content of fulvic acid in the solid content of the black liquor obtained by ammonium sulfite method in the prior art is 6-12%, and the content of fulvic acid in the solid content of the black liquor obtained by alkaline pulping is 1-6%.

The fertilizer in the present invention includes solid fertilizer or liquid fertilizer that is formed by removing part of the water in the black liquor by evaporation and concentration, and adding some auxiliary materials into the obtained concentrated black liquor.

The solid content of the concentrated black liquor is 28-65%, and the baume degree is 9-40. The solid content of 30-65% and baume degree of 18-40 is preferred, while more preferably, solid content of 40-47% and baume degree of 25-29. The pH of the concentrated black liquor is preferred to be 5-11, and a pH of 6-8 is more preferred.

The weight percentage of each composition in the fertilizer in the present invention is as follows:

30-80% for concentrated black liquor (preferably 50-60%)
1-45% for lignin (preferably 15-35%)
1-25% for humic acid (preferably 10-15%)

The drying is spray drying or pulp spraying granulation; preferably the pulp spraying granulation. During the pulp spraying granulation, the nose temperature is 550~600° C., the tail temperature is 47-55° C., and a returning charge rate≥50%.

The sludge and/or ardealite can also be added into the concentrated black liquor. The weight percentage of sludge is 0-45%, and that of ardealite is 0-30%. Preferably, the weight percentage of sludge is 10-20%, and that of ardealite is 5-15%;

The sludge is the biochemical sludge obtained in the papermaking sewage treatment, and its content of organic matter is no less than 50%.

The inorganic auxiliary materials can also be added into the concentrated black liquor. The inorganic auxiliary materials refer to one of, or a mixture of more than two kinds of, the inorganic salts containing N, P or K, preferably KCl. The adding of inorganic auxiliary materials makes the total content of N, $P_2O_5$ and $K_2O$ become 4-30% of the mass percentage of the formula dry weight, preferably 5%.

In the present invention, the auxiliary materials can also be soluble fertilizers of major elements. By adding soluble fertilizers of major elements into the diluted black liquor or the concentrated black liquor, we can get the water flush fertilizers of fulvic acids. The soluble fertilizers of major elements can be one or more of soluble nitrogenous fertilizer, soluble phosphate fertilizer, and soluble potassic fertilizer, among which soluble nitrogenous fertilizer and soluble potassic fertilizer are preferred;

The weight percentage of each composition is as follows:
20-98% of the diluted black liquor or the concentrated black liquor (50-90% preferred);
2-80% of soluble fertilizers of major elements (10-50% preferred);

The soluble nitrogenous fertilizer refers to one of or random mixture of urea, ammonium bicarbonate, ammonium sulfate, ammonium chloride, ammonium dihydrogen phosphate, or diammonium hydrogen phosphate, among which urea is preferred. The weight percentage of the soluble nitrogenous fertilizer in the water flush fertilizer of fulvic acids is 2-60%, and preferably 2-30%;

The soluble phosphate fertilizer refers to one of or random mixture of ammonium dihydrogen phosphate, diammonium hydrogen phosphate, potassium dihydrogen phosphate, or dipotassium hydrogen phosphate, among which ammonium dihydrogen phosphate is preferred. The weight percentage of the soluble phosphate fertilizer in the water flush fertilizer of fulvic acids is 2-60%, and preferably 2-30%;

The soluble potassic fertilizer refers to one of or random mixture of potassium sulfate, potassium chloride, potassium dihydrogen phosphate, or dipotassium hydrogen phosphate, among which potassium chloride is preferred. The weight percentage of the soluble potassic fertilizer in the water flush fertilizer of fulvic acids is 2-50%, and preferably 2-30%;

The soluble fertilizers containing trace elements (such as ferrum, copper, boron, zinc or magnesium, etc.) can also be added into the concentrated black liquor.

8. Substrate Formation by Mixed Fermentation of Seriously Contaminated Condensate and Waste In the present invention, the contaminated condensate is mixed with one or more of the waste, crop byproduct, or organic waste generated in the pulping stock preparation. The mixture is fermented by the nitrogen source in the contaminated condensate to obtain the substrate. Since there is large amount of nutrition constituents in the waste, crop byproduct, or organic waste, for example, there is large amount of organic ingredients such as nitrogen, phosphorus, potassium in the stalk, leaf, and root of the straw, the nitrogen content in 100 kilos of fresh straws is equivalent to 2.4 kilos of nitrogenous fertilizer, the phosphorus content is equivalent to 3.8 kilos of phosphate fertilizer, and the potassium content is equivalent to 3.4 kilos of potash fertilizer. If 500 kilos of straws are returned to the field, it is equivalent to use 50 kilos of standard fertilizers in the field. It can also reduce the volume weight of soil, make the soil more pervious to water and air, improve the capacity of water retaining and soil moisture conservation, as well as enhance the granular structures.

During the aerobic fermentation of compost, the crop straws need a water content of more than 60%, and a temperature of about 55-65° C. Meanwhile, the C:N shall be controlled within the range of 15-30:1, so as to achieve the best fermentation conditions.

In the present invention, the seriously contaminated condensate is preferred. The reason is that the $NH_4^+$—N concentration of the seriously contaminated condensate obtained by the method in the present invention is higher than 4,000 mg/l, so the high-nitrogen seriously contaminated condensate can complement the nitrogen needed during the fermentation of crop straws. Meanwhile, since the seriously contaminated condensate contains nitrogen, it can increase the pH value in the initial stage of fermentation, which can make the strains more suitable to survive in the alkaline conditions. As a result, the fermentation can be completed without adding lime. In addition, the temperature of the contaminated condensate in the present invention can be as high as 50-70° C. When it is mixed with the crops, it can quickly increase the fermentation temperature, accelerate the reproduction of the strains, and significantly shorten the fermentation time.

When the temperature of the fermented mixture is between the ambient temperature and 40° C., the mass ratio of carbon to nitrogen in the fermented mixture and the pH value is detected. If the ratio of the mass percentage of carbon to the mass percentage of nitrogen is within the range of 15~30:1, and the pH value is within the range of 6.5~8.5, the fermentation is completed. Otherwise, the fermentation is not completed. In this case, certain amount of water can be added into the fermented mixture to promote the fermentation, so as to avoid "seedling wilting".

The fermentation mentioned in the present invention includes the following steps:

1) The contaminated condensate or the ammonium sulfite obtained by absorbing flue gas is mixed with crop byproduct or organic waste, the ratio of mass percentage of carbon to mass percentage of nitrogen in the mixture is adjusted to 15~30:1 to obtain the mixture before fermentation; the pH value of the mixture before fermentation is 9.5~10;

2) Spontaneous fermentation is performed for the mixture before fermentation obtained in Step 1) to get the fermented mixture;

3) When the ratio of mass percentage of carbon to mass percentage of nitrogen in the fermented mixture obtained in Step 2) is within the range of 15~30:1, and the pH is within the range of 6.5~8.5, the fermentation is completed and the substrate is obtained.

In the present invention, the bran can be added before fermentation, so as to increase the reproduction rate of the strains and shorten the fermentation period.

Further, in the present invention, before the fermentation, one or more of fermentation strain, nitrogenous fertilizer, phosphate fertilizer, active biochemical sludge, nursery garden earth, lime, or livestock excrement are added according to the real conditions.

The substrate prepared in the present invention has been detected by three authoritative research institutions, i.e. Land Resources and Fertilizer Institute under Beijing Forestry University, Shandong Institute of Plant Nutrition and Fertilizer under Shandong Agricultural University, and Tianjin Institute of Agricultural Resources and Environment Science. Various indicators, such as pH value, EC value, organic matter, humic acid, total nitrogen, total phosphorus, total potassium, available nitrogen, available phosphorus, and available potassium, have conformed to the range of application of the organic substrate. Both the permeability and the nutrient content of the substrate are superior to that of peat and perlite. When the prepared substrate or fertilizer is used for the growth test of plants, the various growing states of the plants are obvious, and no auxiliary materials are needed to be added. Especially when the number of the root systems of a plant increases by more than 30%, the thickness of the root also increases.

The substrates or fertilizers prepared in the present invention include (the percentages are the mass percentages):

| | |
|---|---|
| Water | 20-35% (preferably 30-35%) |
| Organic matter | 10-50% (preferably 20-30%) |
| Humic acid | 5-20% (preferably 10-20%) |
| Total nitrogen | 0.5-2.0% (preferably 1-1.5%) |
| Total potassium | 1.0-2.0% (preferably 1.0-1.5%) |
| Total phosphorus | 0.1-0.5% (preferably 0.1-0.3%) |

The substrate or fertilizer of the present invention contains 5%-20% of humic acid, which can promote the absorption and utilization of the nitrogen, phosphorus, potassium by the crops, improve the physicochemical properties of the soil, stimulate the growth and development of the crops, enhance the resistance of the crops, and improve the quality of the agricultural products, etc.

The contents of the total nitrogen, total phosphorus and total potassium in the substrate or fertilizer of the present invention are respectively 2.3 times, 12 times and 57 times of those of the peat substrate. Therefore, the nutrient contents of the major elements in the substrate or fertilizer of the present invention are obviously superior to those of peat substrate.

For the substrate or fertilizer of the present invention, the total porosity is 40~60, preferably 45~55; the aeration porosity is 30~50, preferably 35~40, and the water-holding porosity is 5~20, preferably 8~12.

9. Preparation of Ammonium Sulfite

In the method of the present invention, the flue gas is dedusted, and then delivered into the desulphurizing tower. The contaminated condensate is introduced via pipeline to absorb $SO_2$ in the flue gas so as to obtain $(NH_4)_2SO_3$ for digestion in ammonium sulfite method. The process includes the following steps:

1) Desulfurization is performed for the flue gas by contaminated condensate. The flue gas is the flue gas from industrial coal, a venturi tube is equipped ahead of the desulphurizing tower for the desulfurization, and the venturi tube is equipped with sprinkler and connected to the bottom of the desulphurizing tower. The dedusted flue gas enters the venturi tube, where it mixes with the mixed liquor of contaminated condensate and ammonia water via the sprinkler in the venturi tube. Then the mixed liquor and the flue gas enter the desulphurizing tower again for desulfurization;

2) The ammonium sulfite solution mixture after desulfurization is used in pulping by the ammonium sulfite method in papermaking. The ammonium sulfite solution has a concentration of 10%-35% and a purity of 80%-99%.

The straw raw materials of the present invention can also come from the raw materials outside the circulation, and the ammonium sulfite also comes from other sources other than the circulation.

The water treatment method mentioned in the present invention includes:

Filtration, flocculation settling, biochemical treatment, and advanced treatment.

Among them, flocculation settling is performed by UPCB treatment. The UPCB treatment includes the following steps:

at first the wastewater fully mixed with flocculants is introduced into the hybrid reaction layer of the UPCB reactor, then facultative, aerobic and cyclic sludge is added into the wastewater at the boundary between the hybrid reaction layer and the augmented reaction layer; after the reaction in the augmented reaction layer, flocculants are added or not added into the wastewater, and the wastewater is delivered into the adsorption filtration layer in UPCB.

The method can also be the one that includes the steps of filtration, sand riffling, flocculation settling, the separation and recycling. Before the flocculants are added into the recycling water to be processed for flocculation settling, desalination is performed for 70-90% of the flocculants (by weight).

The desalination includes the following steps: promoting the flocculation of the flocculants in the clean water, collecting the floc as the flocculants in the flocculation settling step, acidizing the floc, performing the anaerobic treatment to regenerate the floc, and recollecting the regenerated floc as the flocculants in the flocculation settling step.

There are the following advantages in the present invention:

(1) The present invention takes the grass straws and straws from plants of mallow family as the raw material. The digestion and pulping by ammonium sulfite method is performed after stock preparation, so the prepared main products can be fully used, and the waste and the waste liquid generated in each section in the pulping can be reused. Therefore, the additional value of the sub-products from each section of the pulping process is improved;

(2) The present invention uses the waste generated in the stock preparation and the contaminated condensate generated in the evaporation and concentration of the pulping black liquor to prepare the substrate, makes full use of nitrogen element, temperature, alkaline conditions needed for the straw fermentation that can be provided by the contaminated condensate, not only making full use of the resources, but also reducing the waste of the energy;

(3) After the detection of the substrate prepared in the present invention, various indicators, such as pH value, EC value, organic matter, humic acid, total nitrogen, total phosphorus, total potassium, available nitrogen, available phosphorus, and available potassium, have conformed to the range of application of the organic substrate or fertilizer. Both the permeability and the nutrient content of the substrate are superior to that of peat and perlite. When the prepared substrate or fertilizer is used for the growth test of plants, the various growing states of the plants are obvious, and no auxiliary materials are needed to be added. Especially when the number of the root systems of a plant increases by more than 30%, the thickness of the root also increases;

(4) The present invention improves the internal structure of the evaporator, which solves the difficulties in discoloring the contaminated condensate in biochemical treatment due to the high $NH_4^+$—N concentration. Meanwhile, the mildly contaminated condensate is directly used for the washing, and the seriously contaminated condensate, due to its high $NH_4^+$—N concentration, can be used to mix with the waste generated in the stock preparation of the pulping to produce the substrate or fertilizer, and can be used to undergo the flue gas desulfurization to produce the digestion liquid for pulping by ammonium sulfite method, i.e. ammonium sulfite. This not only further creates the economic benefits, but also reduces the operation cost of the substrate or fertilizer fermentation, as well as the cost of pulping by ammonium sulfite method;

(5) By adopting the method in the present invention, the water consumption per ton of pulp is 50 $m^3$, which is much less than that of 80-150 $m^3$ for the prior art of pulping;

(6) For the treatment method and device for recycling water adopted in the present invention, since UPCB process is adopted, the reaction pattern is improved, the reaction time is increased, and the reaction is more adequate and efficient. As a result, the chemical consumption is reduced, and the outflow quality is improved. Meanwhile, the sludge contact filtration mechanism is added, and the removal rate is increased. Just for the applicants of the present invention, millions of RMB can be saved each year.

BRIEF DESCRIPTION OF THE DRAWINGS

The following content is a brief description of the drawings. A clear description of the present invention may be made by the following drawings and in combination of the contents mentioned above.

DETAILED DESCRIPTION OF THE PREFERRED EMBODIMENTS

Figure 1:
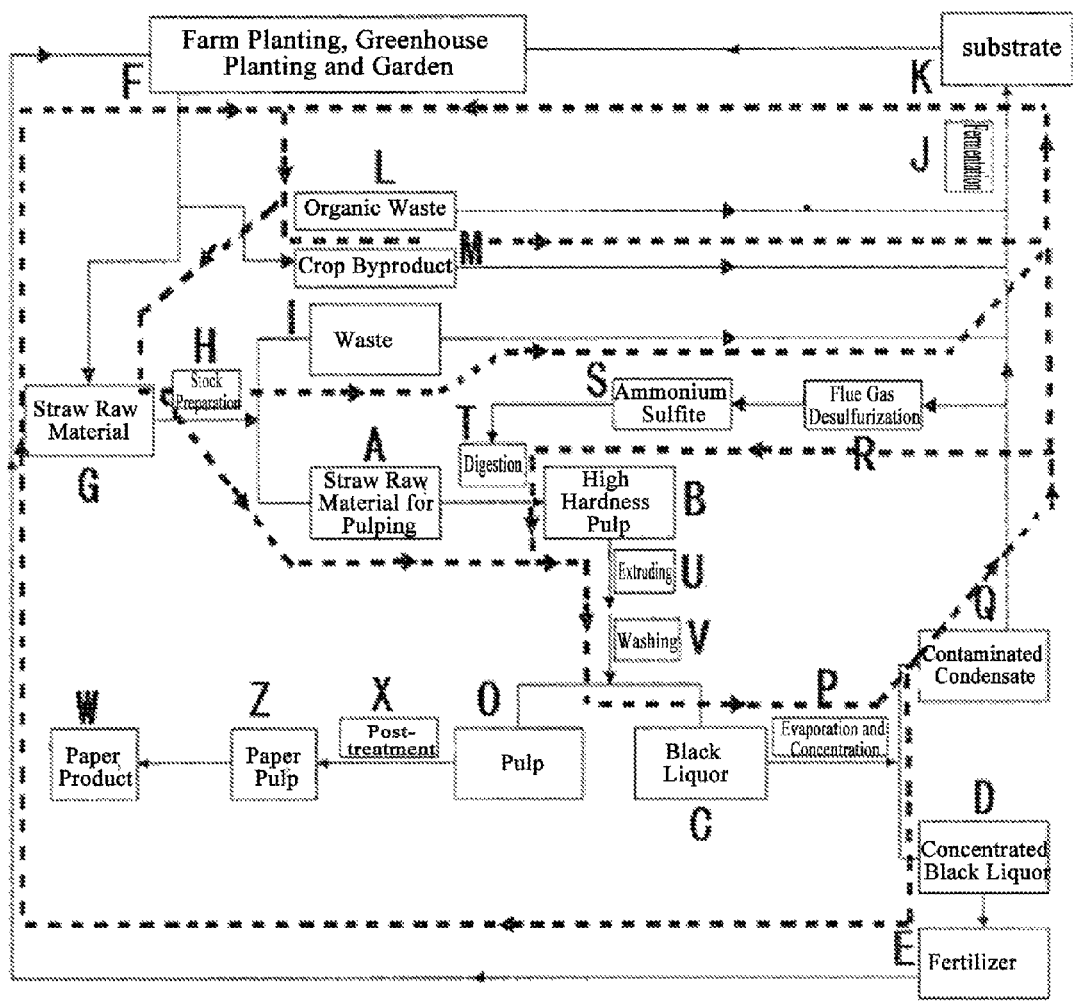
FIG. 1 illustrates the process flow diagram of circular utilization of grass straws mentioned in the present invention.
Figure 2:
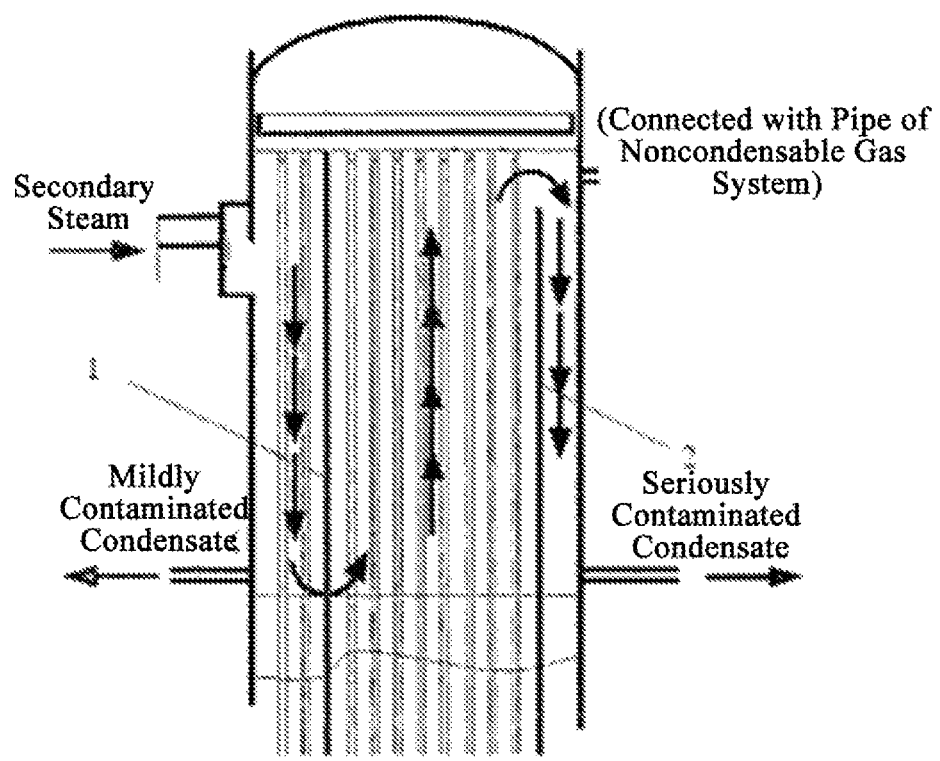
FIG. 2 illustrates the schematic view of the air chamber structure of evaporator mentioned in the present invention, in which 1 refers to the upper dummy plate, and 2 refers to the lower dummy plate.

The following content is a detailed description of the preferred embodiments. A more clear understanding of the present invention may be obtained by the following embodiments and in combination of the specific descriptions mentioned above and the brief description of the drawings.

Embodiment 1

1) Raw Material and Waste Obtained from Stock Preparation

The wheat straw raw materials for pulping and the waste are obtained by conventional dry method stock preparation of the wheat straws.

2) Digestion of Raw Material

The wheat straws for pulping obtained in the previous step are loaded into the rotary spherical digester, and the liquid chemical for digestion (ammonium sulfite) is added into the digester. The amount of ammonium sulfite is 15% of that of absolutely dry raw materials, with a liquor ratio of 1:3.

The temperature is increased to 110° C. during first-time heating, and this temperature is kept for 40 minutes. Then the steam is relieved for 25 minutes. The temperature is increased within 40 minutes to 165° C., and it is kept for 75 minutes.

A high hardness pulp with a hardness of 21 (equivalent to a Kappa number of 34) is obtained;

3) Extruding

The high hardness pulp obtained in Step 2) is delivered into a double-roller pulp extruder, which is used for extracting black liquor in the prior art, for extruding. After extruding, a high hardness pulp with a concentration of 25% and concentrated black liquor are obtained;

4) Pulp Washing and Black Liquor Recycling

The high hardness pulp with a concentration of 25%, which is obtained in Step 3), is diluted to 2.5% by 70° C. black liquor. Then the pulp is delivered into the three-stage vacuum pulp washer for washing, then the washed pulp and black liquor are obtained. The black liquor will be recycled to the digestion in Step 2).

5) Oxygen Delignification

The temperature of the washed pulp obtained in Step 4) is increased by screw conveyer to 70° C. Then the pulp is delivered into the median concentration pulp pipe. In the median concentration pulp pipe, the pulp is fluidized first by removing the air in the pulp via thermal refining. Then it is delivered into the reaction tower for oxygen delignification by centrifugal median concentration pulp pump. Before entering the reaction tower, the pulp is, in the pipe, mixed with the oxygen (with an adding amount of 30 kg per ton of pulp) and the aqueous alkali (with an alkali amount of 3% of that of absolutely dry pulp in sodium hydroxide), and heated by the steam that is delivered into the pipe. After the pulp is intensively mixed, it is delivered into No. 1 reaction tower for oxygen delignification. The protective agent is magnesium sulfate, the amount of which is 1.2% of the weight of the absolutely dry pulp. The inlet temperature is 98° C., and the pressure is 1.05 Mpa. The pulp is kept in the tower for 85 minutes so that the complete delignification reaction is realized. The tower top temperature is 102° C., and the pressure is kept as 0.4 Mpa. Then the pulp, which is discharged by the tripper, is delivered into No. 2 reaction tower for oxygen delignification via No. 2 median concentration pump. 10 Kg oxygen and 10 Kg NaOH are added, and 20 Kg $H_2O_2$ is used as the enhancer. The temperature and pressure are the same as that of No. 1 reaction tower. The pulp is kept there for 85 min. After the treatment is completed, the pulp is blown out into the pulp chest for dilution.

An unbleached pulp with a fracture length of 5.3 km, a folding number of 80 times, a tearing strength of 220 mN, a whiteness of 45% ISO, and a beating degree of 34° SR is obtained.

The unbleached pulp is first beaten in a cylindrical refiner, with a beating concentration of 3.8%, a beating pressure of 0.20 MPa, and a beating current of 65 A. Then the pulp is delivered into a double-disc refiner for beating, with a beating concentration of 3.3%, a beating pressure of 0.15 MPa, and a beating current of 50 A. After beating, a finished pulp with a beating degree of 48° SR and a beating wet weight of 2.9 g is obtained.

The beaten pulp is used for papermaking in a single-cylinder, single-dryer single-felt toilet paper machine, with a basis weight of (11.0±2.0) g/m$^2$, an untrimmed width of 2,900 mm, and a speed of 260 m/min. Then the unbleached paper with a basis weight of 11.6 g/m$^2$, a horizontal suction range of 50 mm/100 s, a tensile index of ≥8.3N·m/g, a scratchability of 176 mN and a brightness of 42% is obtained.

6) Concentration of Black Liquor

The black liquor obtained from Step 3) and Step 4) is evaporated and concentrated in a sextuple-effect seven-part gas evaporator.

The temperatures for the sextuple effects are respectively as follows: 110-100° C. for Effect I, 90-100° C. for Effect II, 80-90° C. for Effect III, 70-80° C. or Effect IV, 60-70° C. for Effect V, and 50-60° C. for Effect VI. The concentration for various effects shall be as follows (in baume degree): 5-8 for Effect VI, 7-10 for Effect V, 9-12 for Effect IV, 11-14 for Effect III; 14-17 for Effect II, and 18-21 for Effect I for the first time of passing Effect II and Effect I; and 23-25 for Effect II, and 25-29 for Effect I for the second time of passing Effect II and Effect I. Then a concentrated black liquor (with a solid content of 60%, a baume degree 20, and pH of 6), a seriously contaminated condensate (with an $NH_4^+$—N concentration of 4,000 mg/l, and a temperature of 70° C.), and a mildly contaminated condensate (with an $NH_4^+$—N concentration of 100 mg/l) are obtained.

7) Fertilizer Preparation

The concentrated black liquor, lignin, humic acid, and sludge are mixed into slurry, with their mass percentage respectively being 60%, 25%, 10% and 5%. Then pulp spraying granulation is performed, with a nose temperature of 600° C., and a tail temperature of 55° C. Then a solid state fulvic acid fertilizer is obtained, with grain sizes of 3-5 mm, a hardness of 23.4N, a content of organic matter of 60%, a total content of N+$P_2O_5$+$K_2O$ of 4%, and a content of fulvic acid of 30%.

The mildly contaminated condensate with an $NH_4^+$—N concentration of 100 m$_g$/l is reused in the washing section in Step 4).

8) Substrate Formation by Mixed Fermentation of Seriously Contaminated Condensate and Waste 1,000 Kg of waste generated in Step 1) is collected, and 3,000 Kg of seriously contaminated condensate obtained in Step 6) with an $NH_4^+$—N concentration of 4,000 mg/l and a temperature of 70° C. is added. The mixture before fermentation is obtained by mixing and stirring them uniformly. In the mixture, the water content is 60%, the ratio of the mass percentage of carbon to the mass percentage of nitrogen is 25:1, and the value of pH is 9.5. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 35° C., the fermentation is completed, with the pH being 6.5.

The obtained organic substrate product has 31.25% of organic matters, 7.85% of humic acid. Its total potassium content is 1.13%, total phosphorus content is 0.12%, and total nitrogen content is 1.13%. The aeration porosity is 38.8%, the total porosity is 49.64, and the water-holding porosity is 10.84%. In addition, there are some trace elements: 22.53 mg/kg of copper, 62.70 mg/kg of zinc, 2.38 g/kg of ferrum, and 281.03 mg/kg of Manganese.

The obtained substrate can be used for farm planting of wheat, but not only limited to wheat.

Embodiment 2

1) Raw Material and Waste Obtained from Stock Preparation

The rice straws for pulping and the waste are obtained through dry method stock preparation of rice straws by hammer crusher. Then rice straws for pulping are steeped in the organ of Corti for steeping. The steeping liquor is an aqueous alkali with an alkali amount of 4% of that of absolutely dry raw materials in sodium hydroxide, with a liquor ratio of 1:4. After the straws are steeped and mixed for 40 minutes in the liquor at an ordinary pressure and a temperature of 85° C., the steeped raw materials are obtained.

2) Digestion of Raw Material

The steeped raw materials obtained in Step 1) are sent into the rotary spherical digester, and the liquid chemical for digestion (ammonium sulfite) is added into the digester. The amount of ammonium sulfite is 11% of that of absolutely dry raw materials, with a liquor ratio of 1:3.

The steam is supplied into the rotary spherical digester for heating to the temperature of 125° C., and the temperature is kept for 40 minutes. The steam is relieved in small scale. The temperature is increased to 170° C., and the temperature is kept for 75 minutes.

A high hardness pulp with a K value of 18 (equivalent to a Kappa number of 27) is obtained.

3) Extruding

The high hardness pulp with a concentration of 15% obtained in Step 2) is delivered into a single-roller pulp extruder from the inlet for extruding. After the black liquor is extruded, the pulp with a concentration of 30% is discharged from the outlet. The high hardness pulp has a beating degree of 28° SR before extruding, which becomes 29° SR after extruding. The baume degree of the extruded black liquor is 11° Be' at 20° C. The concentration of the residual ammonium sulfite in the black liquor is 8 g/L;

4) Pulp Washing and Black Liquor Recycling

The pulp from the outlet of pulp extruder in Step 3) is diluted by diluted black liquor with a temperature of 60° C., so as to make the pulp concentration become 2.5%. Then the pulp is delivered to a jigging screen for screening. Then the pulp is washed by conventional method. After pulp washing, the concentration of the pulp is adjusted to 10%. The black liquor obtained after pulp washing is recycled to the digestion in Step 2).

5) Oxygen Delignification

The washed pulp obtained in Step 4) is defibered by deflaker, and then delivered into the median concentration pulp pipe. In the median concentration pulp pipe, the pulp is fluidized first by removing the air in the pulp via thermal refining. Then it is delivered into the reaction tower for oxygen delignification by centrifugal median concentration pulp pump. Before entering the reaction tower, the pulp is, in the pipe, mixed with the oxygen (with an adding amount of 20 kg per ton of pulp) and the aqueous alkali (with an alkali amount of 4% of that of absolutely dry pulp in sodium hydroxide), and heated by the steam that is delivered into the pipe. After the pulp is intensively mixed, it is delivered into a reaction tower for oxygen delignification. The protective agent is magnesium sulfate, the amount of which is 1% of the weight of the absolutely dry pulp. The inlet temperature is 95° C., and the pressure is 0.9 Mpa. The pulp is kept in the tower for 75 minutes so that the complete delignification reaction is realized. The tower top temperature is 100° C., and the pressure is kept as 0.5 MPa. After the treatment is completed, the pulp is blown out into the pulp pond for dilution. At this very time, the hardness of the pulp is reduced to a K value of 10 (equivalent to a Kappa number of 13). Then with a pump, the diluted pulp is pumped into the vacuum pulp washer for washing, screening and purification.

An unbleached pulp with a whiteness of 41% ISO, a fracture length of 5.2 km, a tearing strength of 240 mN, a folding number of 45 times, and a beating degree of 32° SR is obtained.

6) Concentration of Black Liquor

The diluted black liquor obtained from Step 3) and Step 4) is evaporated and concentrated in a sextuple-effect seven-part gas evaporator.

The temperatures for the sextuple effects are respectively as follows: 110-100° C. for Effect I, 90-100° C. for Effect II, 80-90° C. for Effect III, 70-80° C. or Effect IV, 60-70° C. for Effect V, and 50-60° C. for Effect VI. The concentration for various effects shall be as follows (in baume degree): 5-8 for Effect VI, 7-10 for Effect V, 9-12 for Effect IV, 11-14 for Effect III; 14-17 for Effect II, and 18-21 for Effect I for the first time of passing Effect II and Effect I; and 23-25 for Effect II, and 25-29 for Effect I for the second time of passing Effect II and Effect I. Then a concentrated black liquor (with a solid content of 60%, a baume degree 20, and pH of 6), a seriously contaminated condensate (with an $NH_4^+$—N concentration of 5,000 mg/l, and a temperature of 50° C.), and a mildly contaminated condensate (with an $NH_4^+$—N concentration of 90 mg/l) are obtained.

7) Fertilizer Preparation

Mix the concentrated black liquor, lignin, humic acid, and sludge into slurry, with their mass percentage respectively being 50%, 35%, 10% and 5%. KCl is added. Then pulp spraying granulation is performed, with a nose temperature of 560° C., and a tail temperature of 52° C. Then a solid state fulvic acid fertilizer is obtained, with grain sizes of 3-5 mm, a hardness of 19.4N, a content of organic matter of 65%, a total content of $N+P_2O_5+K_2O$ of 5%, and a content of fulvic acid of 24%.

The mildly contaminated condensate with an $NH_4^+$—N concentration of 90 mg/l is reused in the washing section in Step 4).

8) Substrate Formation by Mixed Fermentation of Seriously Contaminated Condensate and Waste 1,000 Kg of waste generated in Step 1) is collected, and 3,000 Kg of seriously contaminated condensate obtained in Step 6) with an $NH_4^+$—N concentration of 5,000 mg/l and a temperature of 50° C. is added. The mixture before fermentation is obtained by mixing and stirring them uniformly. In the mixture, the water content is 60%, the ratio of the mass percentage of carbon to the mass percentage of nitrogen is 25:1, and the value of pH is 9.5. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 38° C., the fermentation is completed, with the pH being 6.5.

The obtained organic substrate product has 31.25% of organic matters, 7.85% of humic acid. Its total potassium content is 1.13%, total phosphorus content is 0.12%, and total nitrogen content is 1.13%. The aeration porosity is 38.8%, the total porosity is 49.64, and the water-holding porosity is 10.84%. In addition, there are some trace elements: 22.53 mg/kg of copper, 62.70 mg/kg of zinc, 2.38 g/kg of ferrum, and 281.03 mg/kg of Manganese.

The obtained substrate can be used for farm planting of rice, but not only limited to rice.

Embodiment 3

1) The reed raw materials for pulping and the waste are obtained through dry method stock preparation of reeds by hammer crusher.

2) Digestion of Raw Material

The chemical for digestion (ammonium sulfite) is added into the reed raw materials for pulping obtained in Step 1). Then the digestion is performed with horizontal tube continuous digestion. The amount of ammonium sulfite is 10% of that of absolutely dry raw materials, with a liquor ratio of 1:3.5.

The steam is supplied for heating to the temperature of 172° C., which totally costs 35-40 minutes.

A high hardness pulp with a K value of 27 is obtained.

3) Extruding

The pulp obtained in Step 2) is extruded by conventional method to obtain the extruded pulp and concentrated black liquor.

4) Pulp Washing and Black Liquor Recycling

The extruded pulp obtained in Step 3) is washed by conventional method to obtain the washed pulp and diluted black liquor.

5) Oxygen Delignification

The defibering and oxygen delignification is performed for the washed pulp obtained in Step 4) by conventional method. An unbleached pulp with a whiteness of 45% ISO, a fracture length of 5.0 km, a folding number of 90 times, and a tearing strength of 230 mN is obtained.

Then beating and papermaking is performed on the pulp by conventional method to obtain the unbleached paper.

6) Concentration of Black Liquor

The diluted black liquor obtained in Step 3) and the black liquor obtained in Step 4) are mixed to obtain a new black liquor with a solid content of 15% and a baume degree of 9. Then the black liquor is evaporated and concentrated in a conventional quintuple-effect evaporator. Concentrated black liquor with a solid content of 30%, a baume degree of 18, and a pH value of 11 is obtained, so is a contaminated condensate with an $NH_4^+$—N concentration of 1,800 mg/l and a temperature of 60° C.

7) Fertilizer Preparation

The concentrated black liquor, lignin, and humic acid are mixed into slurry, with their mass percentage respectively being 30%, 45% and 25%. Then a fulvic acid fertilizer is obtained through direct drying, with a content of organic matter of 70%, a total content of $N+P_2O_5+K_2O$ of 4%, and a content of fulvic acid of 5%.

8) Substrate Formation by Mixed Fermentation of Seriously Contaminated Condensate and Waste 1,000 Kg of waste generated in Step 1) is collected, and 5,000 Kg of contaminated condensate obtained in Step 6) with an $NH4^+$—N concentration of 1,800 mg/l and a temperature of 60° C. is added. The mixture before fermentation is obtained by mixing and stirring them uniformly. In the mixture, the water content is 60%, the ratio of the mass percentage of carbon to the mass percentage of nitrogen is 25:1, and the value of pH is 9.6. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 35° C., the fermentation is completed, with the pH being 6.5. The obtained organic substrate product has 20% of organic matters, 10% of humic acid. Its total potassium content is 1.5%, total phosphorus content is 0.3%, and total nitrogen content is 1%. The aeration porosity is 35%, the total porosity is 45, and the water-holding porosity is 8%. In addition, there are some trace elements: 22.56 mg/kg of copper, 62.56 mg/kg of zinc, 2.42 g/kg of ferrum, and 281.10 mg/kg of Manganese.

The obtained substrate can be used for farm planting of reeds.

Embodiment 4

1) The cotton stalk raw materials for pulping and the waste are obtained through conventional dry method stock preparation of cotton stalks.

2) Digestion of Raw Material

The cotton stalk raw materials for pulping obtained in Step 1) are loaded into a continuous digester. Then the chemical for digestion (ammonium sulfite) is added into the continuous digester. The amount of ammonium sulfite is 15% of that of absolutely dry raw materials, with a liquor ratio of 1:3.5.

The steam is supplied for heating to the temperature of 172° C., which totally costs 40 minutes.

A high hardness pulp with a K value of 20 is obtained.

3) Extruding

The pulp obtained in Step 2) is extruded by conventional method to obtain the extruded pulp and concentrated black liquor.

4) Pulp Washing and Black Liquor Recycling

The extruded pulp obtained in Step 3) is washed by conventional method to obtain the washed pulp and diluted black liquor. The diluted black liquor can be partly reused for the digestion in Step 2).

5) Oxygen Delignification

The defibering and oxygen delignification is performed for the washed pulp obtained in Step 4) by conventional method. An unbleached pulp with a whiteness of 23% ISO, a tearing strength of 280 mN, a fracture length of 6.0 km, and a folding number of 40 times is obtained.

Then beating and papermaking is performed on the pulp by conventional method to obtain the unbleached paper.

6) Concentration of Black Liquor

The diluted black liquor obtained from Step 3) is evaporated and concentrated in a sextuple-effect seven-part gas evaporator. The temperatures for the sextuple effects are respectively as follows: 110-100° C. for Effect I, 90-100° C. for Effect II, 80-90° C. for Effect III, 70-80° C. or Effect IV, 60-70° C. for Effect V, and 50-60° C. for Effect VI. The concentration for various effects shall be as follows (in baume degree): 5-8 for Effect VI, 7-10 for Effect V, 9-12 for Effect IV, 11-14 for Effect III; 14-17 for Effect II, and 18-21 for Effect I for the first time of passing Effect II and Effect I; and 23-25 for Effect II, and 25-29 for Effect I for the second time of passing Effect II and Effect I. Then a concentrated black liquor (with a solid content of 63%, a baume degree 39, and pH of 5), a seriously contaminated condensate (with an $NH_4^+$—N concentration of 4,300 mg/l, and a temperature of 65° C.), and a mildly contaminated condensate (with an $NH_4^+$—N concentration of 85 mg/l) are obtained.

7) Fertilizer Preparation

The concentrated black liquor, lignin, and humic acid are mixed into slurry, with their mass percentage respectively being 80%, 5% and 15%. KCl is added. Then a solid state fulvic acid fertilizer is obtained, with a content of organic matter of 67%, a total content of $N+P_2O_5+K_2O$ of 4%, and a content of fulvic acid of 40%. The mildly contaminated condensate with an $NH_4^+$—N concentration of 85 mg/l is reused in the washing section in Step 4).

8) Substrate Formation by Mixed Fermentation of Seriously Contaminated Condensate and Waste 1,000 Kg of waste cotton stalks generated in Step 1) is collected, and 3,500 Kg of seriously contaminated condensate obtained in Step 6) with an $NH_4^+$—N concentration of 4,300 mg/l and a temperature of 65° C. is added. The mixture before fermentation is obtained by mixing and stirring them uniformly. In the mixture, the water content is 60%, the ratio of the mass percentage of carbon to the mass percentage of nitrogen is 25:1, and the value of pH is 9.6. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 26° C., the fermentation is completed, with the pH being 7.2. The obtained organic substrate product has 30% of organic matters, 15% of humic acid. Its total potassium content is 1.8%, total phosphorus content is 0.4%, and total nitrogen content is 1.5%. The aeration porosity is 40%, the total porosity is 55, and the water-holding porosity is 12%. In addition, there are some trace elements: 22.63 mg/kg of copper, 62.62 mg/kg of zinc, 2.51 g/kg of ferrum, and 281.12 mg/kg of Manganese.

The obtained substrate can be used for farm planting of cotton.

Embodiment 5

1) Raw Material and Waste Obtained from Stock Preparation

The raw materials for pulping and the waste are obtained through dry method stock preparation by hammer crusher by using the rice straws and wheat straws with a mass ratio of 1:3;

2) Digestion of Raw Material

The raw materials for pulping obtained in Step 1) are loaded into a batch-type spherical digester. Then the chemical for digestion (ammonium sulfite) is added into the continuous digester. The amount of ammonium sulfite is 13% of that of absolutely dry raw materials, with a liquor ratio of 1:3.5. The steam is supplied for heating to the temperature of 115° C., and the temperature is kept for 35 minutes. The steam is relieved in small scale. The temperature is increased to 172° C., and the temperature is kept for 70 minutes. A high hardness pulp with concentration of 14% and a K value of 19 is obtained.

3) Extruding

The pulp obtained in Step 2) is extruded by conventional method to obtain the extruded pulp and concentrated black liquor.

4) Pulp Washing and Black Liquor Recycling

The extruded pulp obtained in Step 3) is washed by conventional method to obtain the washed pulp and diluted black liquor;

5) Oxygen Delignification

The defibering and double-stage oxygen delignification is performed for the washed pulp obtained in Step 4) by conventional method. An unbleached pulp with a whiteness of 50% ISO, a fracture length of 5.6 km, a tearing strength of 200 mN, a folding number of 45 times, and a beating degree of 42° SR is obtained. Then the pulping and papermaking are performed through the conventional method to obtain the paper with low whiteness;

6) Concentration of Black Liquor

The concentrated black liquor obtained in Step 3) and the diluted black liquor obtained in Step 4) are mixed to obtain a new black liquor with a solid content of 15% and a baume degree of 9. Then the black liquor is evaporated and concentrated. A concentrated black liquor with a solid content of 30% and a baume degree of 18 is obtained, so is a contaminated condensate with an $NH_4^+$—N concentration of 1,600 mg/l and a temperature of 55° C.;

7) Fertilizer Preparation

The concentrated black liquor, lignin, and humic acid are mixed into slurry, with their mass percentage respectively being 30%, 45% and 25%. Then a fulvic acid fertilizer is obtained through direct drying, with a content of organic matter of 70%, a total content of $N+P_2O_5+K_2O$ of 4%, and a content of fulvic acid of 5%;

8) Substrate Formation by Mixed Fermentation of Contaminated Condensate and Waste 1,000 Kg of waste generated in Step 1) is collected, and 4,500 Kg of contaminated condensate obtained in Step 6) with an $NH_4^+$—N concentration of 1,600 mg/l and a temperature of 55° C. is added. The mixture before fermentation is obtained by mixing and stirring them uniformly. In the mixture, the water content is 60%, the ratio of the mass percentage of carbon to the mass percentage of nitrogen is 25:1, and the value of pH is 9.6. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 32° C., the fermentation is completed, with the pH being 8.2. The obtained substrate has 30% of organic matters, 15% of humic acid. Its total potassium content is 1.8%, total phosphorus content is 0.4%, and total nitrogen content is 1.5%. In addition, there are some trace elements: 22.63 mg/kg of copper, 62.62 mg/kg of zinc, 2.51 g/kg of ferrum, and 281.12 mg/kg of Manganese;

9) The fertilizer obtained in Step 7) can be used for farm planting of rice and wheat, but not only limited to rice and wheat. After the harvest, the rice straws and the wheat straws can be reused in Step 1) for stock preparation, so as to enter the circulation mentioned above.

Embodiment 6

1) Raw Material and Waste Obtained from Stock Preparation

The bamboo reed raw materials for pulping with a length of 30 mm and the waste are obtained through conventional dry method stock preparation of bamboo reeds.

2) Digestion of Raw Material

The bamboo reed raw materials for pulping obtained in Step 1) are loaded into the digester by packer via the hot black liquor with a temperature of 140° C. When the digester is fully filled, the cover is closed. The chemical for digestion with a temperature of 160° C. is added into the digester. In the said chemical for digestion, the amount of the ammonium sulfite is 15% of that of absolutely dry raw materials, and the liquor ratio is 1:10. Meanwhile, the air in the digester is discharged, and the pressure is increased to 0.75 MPa. The circulating pump for heating of digestion liquor in the system and the tube still heater are used to heat the digestion liquor to 173° C. The period of temperature rise, thermal insulation, and displacement lasts for 220 minutes. The final pH value is adjusted to 8.5. Finally, the pulp is delivered to the blow tank by pumps. After digestion, a bamboo reed pulp with a K value of 16 (equivalent to a Kappa number of 24) and a beating degree of 10° SR is obtained.

3) Extruding

The concentration of the bamboo reed pulp obtained in Step 2) is adjusted to 10% by using the black liquor. Then the pulp is delivered to the single-screw pulp extruder for the treatment of "concentrated" black liquor discharge. The obtained concentrated black liquor can be used as the water reducer for subsequent evaporation. The concentration of the pulp is increased from 10% before extruding to 30% after extruding. The concentration of the extruded black liquor is 9

Be'(20° C.), and that of residual ammonium is 14 g/L. The extruded bamboo reed pulp is diluted to 3.0% by the diluted black liquor with a temperature of 60° C. and a concentration of 6.1° Be'. The pulp is delivered to jigging screen for coarse pulp screening, with the loss at jigging screen of 0.3%. The impurities are removed by high concentration deslagger, with a loss of 0.2%.

4) Pulp Washing and Black Liquor Recycling

The bamboo reed pulp is washed by drum-type vacuum pulp washer for washing. The washing temperature is 65° C. The beating degree of the coarse pulp entering the pulp washer is 31° SR.

5) Oxygen Delignification

The heated pulp is delivered into the median concentration pulp pip for thermal refining, and then delivered into the reaction tower for oxygen delignification for delignification treatment by median concentration pump. After that, the pulp is washed again by the black liquor for oxygen delignification. The wet weight of the washed pulp is 1.8 g, and the residual fluid after pulp washing is 440 ppm.

The concentration of the washed pulp is 9%. An unbleached pulp with a whiteness of 40% ISO, a fracture length of 7,200 m, a tearing strength of 250 mN, a folding number of 45 times, and a beating degree of 32° SR is obtained. The beating is performed respectively for 70% (by weight) of the unbleached pulp mentioned above and 30% of the bleached wood pulp. The pulping concentration of the unbleached pulp is 3.0%, while that of the wood pulp is 4.5%. The beating is performed in a double-disc refiner. The finished pulp quality standards after beating are as follows: the beating degree of the unbleached pulp is 35° SR, and the wet weight for beating is 1.6 g; the beating degree of the wood pulp is 46° SR, and the wet weight for beating is 2.0 g. The bleached wood pulp is the one treated by the prior art, including NBKP, needle bleached sulfite wood pulp, etc. The beaten pulp is used for papermaking in the paper machines commonly used in the prior art. The unbleached scholastic paper with a basis weight of 70 g/m² is obtained;

6) Concentration of Black Liquor

The extruded black liquor obtained from Step 3), with a concentration of 9 Be'(20° C.) and a residual concentration of 14 g/L, is evaporated and concentrated in a sextuple-effect seven-part gas evaporator. The temperatures for the sextuple effects are respectively as follows: 110-100° C. for Effect I, 90-100° C. for Effect II, 80-90° C. for Effect III, 70-80° C. or Effect IV, 60-70° C. for Effect V, and 50-60° C. for Effect VI. The concentration for various effects shall be as follows (in baume degree): 5-8 for Effect VI, 7-10 for Effect V, 9-12 for Effect IV, 11-14 for Effect III; 14-17 for Effect II, and 18-21 for Effect I for the first time of passing Effect II and Effect I; and 23-25 for Effect II, and 25-29 for Effect I for the second time of passing Effect II and Effect I. Then a concentrated black liquor (with a solid content of 65%, a baume degree 40, and pH of 5), a seriously contaminated condensate (with an $NH_4^+$—N concentration of 4,500 mg/l, and a temperature of 25° C.), and a mildly contaminated condensate (with an $NH_4^+$—N concentration of 80 mg/l) are obtained;

7) Fertilizer Preparation

The concentrated black liquor, lignin, and humic acid are mixed into slurry, with their mass percentage respectively being 80%, 5% and 15%. KCl is added. Then a solid state fulvic acid fertilizer is obtained, with a content of organic matter of 67%, a total content of $N+P_2O5+K_2O$ of 4%, and a content of fulvic acid of 40%. The mildly contaminated condensate with an $NH_4^+$—N concentration of 80 mg/l is reused in the washing section in Step 3);

8) Substrate Formation by Mixed Fermentation of Contaminated Condensate and Waste 1,000 Kg of waste generated in Step 1) is collected, and 4,000 Kg of seriously contaminated condensate obtained in Step 6) with an $NH_4^+$—N concentration of 4,500 mg/l and a temperature of 25° C. is added. The mixture before fermentation is obtained by mixing and stirring them uniformly. In the mixture, the water content is 60%, the ratio of the mass percentage of carbon to the mass percentage of nitrogen is 20:1, and the value of pH is 9.8. After mixing, the mixture undergoes spontaneous aerobic fermentation. The temperature during fermentation is monitored. The temperature keeps rising during fermentation. After it reaches 55-60° C., it will last for 25 days. Then it goes down. When it becomes 40° C., the fermentation is completed, with the pH being 6.5. The obtained organic substrate product has 50% of organic matters, 20% of humic acid. Its total potassium content is 2.0%, total phosphorus content is 0.5%, and total nitrogen content is 2%. The aeration porosity is 50%, the total porosity is 60, and the water-holding porosity is 20%. In addition, there are some trace elements: 22.48 mg/kg of copper, 62.65 mg/kg of zinc, 2.38 g/kg of ferrum, and 281.03 mg/kg of Manganese.

The obtained substrate can be used for farm planting of bamboo reeds, but not only limited to bamboo reeds.

Embodiment 7

The substrate preparation is made according to the method in Embodiment 1. The difference is that the raw materials for fermentation are respectively the crop byproduct such as rice straws, or organic waste in the domestic garbage, and the mixture of the crop byproduct such as rice straws, organic waste in the domestic garbage and the byproduct of pulping stock preparation, with a mixing weight ratio of 1:1. The obtained fertilizer has the basically same effect as that in Embodiment 1.

Comparison Example 1

Comparison Table of Physical and Chemical Indicators for Substrate and Peat

The following table is the comparison table of physical and chemical indicators for substrate and peat for the present invention.

| | Test Results | | | |
|---|---|---|---|---|
| | Measured Value | | | |
| Test Item | Substrate for Present Invention | Peat | Unit | Analysis and Test Method |
| pH value | 7.45 | 6.8 | | Saturated digestion-pH meter method |
| Organic matter | 24.32 | 40.3 | % | Potassium dichromate volume-weight - dilution heat method |

-continued

| | Test Results | | | |
|---|---|---|---|---|
| | Measured Value | | | |
| Test Item | Substrate for Present Invention | Peat | Unit | Analysis and Test Method |
| Humic acid | 12.47 | 16.3 | % | Alkaline sodium pyrophosphate digestion method |
| Total nitrogen | 1.14 | 1.06 | % | $H_2SO_4$—$H_2O_2$ digestion method |
| Total P ($P_2O_6$) | 0.12 | 0.03 | % | $H_2SO_4$—$H_2O_2$ digestion, Mo—Sb colorimetric method |
| Total K ($K_2O$) | 1.13 | 0.21 | % | $H_2SO_4$—$H_2O_2$ digestion, flame photometer method |
| Copper | 22.53 | 15.4 | mg/kg | Atomic absorption spectrophotometry |
| Zinc | 62.70 | 34.96 | mg/kg | Atomic absorption spectrophotometry |
| Ferrum | 2.38 | 3.0 | g/kg | Atomic absorption spectrophotometry |
| Manganese | 281.03 | 453 | mg/kg | Atomic absorption spectrophotometry |
| EC value | 1.93 | 0.15 | ms/cm | Saturated digestion-conductivity method |
| Specific weight | 0.33 | 0.44 | g/cm$^3$ | Pycnometer method |
| Volume weight | 0.19 | 0.20 | g/cm$^3$ | |
| Total porosity | 49.64 | 38.8 | % | Saturation method |
| Aeration porosity | 38.80 | 12.75 | % | |
| Water-holding porosity | 10.84 | 26.05 | % | |
| Large and small porosity ratio | 3.78 | 0.49 | | |
| Water content | 30-50 | 30-50 | % | |
| Test results | When the substrate EC value is 1.93 Ms/cm, and the substrate conductivity (EC value) is <2.6 Ms/cm, there is no harm to the various crops; The pH value of substrate is 7.95, while that of peat substrate is 4.5-7.5, with no obvious difference; The average contents of N, P and K in peat substrate are as follows: 0.49%-3.27% for total nitrogen, 0.01%-0.34% for total phosphorus, and 0.01%-0.59% for total potassium. The contents of the total nitrogen, total phosphorus and total potassium in the substrate in the present invention are respectively 2.3 times, 12 times and 57 times of those of the peat substrate; The aeration porosity of the substrate is 38.80%, while the average aeration porosity of the peat substrate is 5%-30%. Therefore, the aeration porosity of the substrate is better than that of peat substrate. | | | |

From the above test results, we can see that the contents of total nitrogen, total phosphorus and total potassium in the substrate are higher than those of peat, so is the aeration porosity. Therefore, the effect of the substrate is better than that of peat substrate.

Embodiment 8

1) Raw Material and Waste Obtained from Stock Preparation

The bagasse raw materials for pulping and the waste are obtained through conventional dry method stock preparation of bagasse.

2) Digestion of Raw Material

The bagasse raw materials for pulping obtained in the previous step are loaded into a rotary spherical digester. Then the chemical for digestion (ammonium sulfite) is added into the rotary spherical digester. The amount of ammonium sulfite is 10% of that of absolutely dry raw materials, with a liquor ratio of 1:3.5. The steam is supplied for heating to the temperature of 115° C., and the temperature is kept for 35 minutes. The steam is relieved in small scale. The temperature is increased to 172° C., and the temperature is kept for 70 minutes. A high hardness pulp with concentration of 14% and a K value of 18 is obtained;

3) Extruding

The pulp obtained in Step 2) is extruded by conventional method to obtain the extruded pulp and concentrated black liquor.

4) Pulp Washing and Black Liquor Recycling

The extruded pulp obtained in Step 3) is washed by conventional method to obtain the washed pulp and diluted black liquor;

5) Oxygen Delignification

The defibering and single-stage oxygen delignification is performed for the washed pulp obtained in Step 4) by conventional method. An unbleached pulp with a whiteness of 40% ISO, a fracture length of 4.5 km, a tearing strength of 300 mN, a folding number of 30 times, and a beating degree of 32° SR is obtained. Then the pulping and papermaking are performed through the conventional method to obtain the unbleached paper;

6) Concentration of Black Liquor

The black liquor obtained in Step 3) and the black liquor obtained in Step 4) are mixed to obtain a new diluted black liquor with a solid content of 15% and a baume degree of 9. Then the black liquor is evaporated and concentrated. Concentrated black liquor with a solid content of 30% and a baume degree of 18 is obtained, so is a contaminated condensate with an NH4+—N concentration of 1,700 mg/l and a temperature of 48° C.

7) Fertilizer Preparation

The concentrated black liquor, lignin, and humic acid are mixed into slurry, with their mass percentage respectively being 30%, 45% and 25%. Then a fulvic acid fertilizer is obtained through direct drying, with a content of organic matter of 70%, a total content of N+$P_2O_5$+$K_2O$ of 4%, and a content of fulvic acid of 5%.

8) Generation of Ammonium Sulfite and Substrate Formation by Mixed Fermentation

The contaminated condensate obtained in Step 6) with an $NH_4^+$—N concentration of 1,700 mg/l and a temperature of 48° C. is used for waste flue gas desulfurization to obtain the ammonium sulfite, which is used as the digestion liquid in ammonium sulfite method in Step 2) for digestion. The method for waste flue gas desulfurization is a method using the prior art.

Or the adding is made during the substrate fermentation in Embodiment 1-Embodiment 3, which provides additional nitrogen source to enter the circulation.

Embodiment 9

It is the same as other embodiments, with the following differences:

8) Generation of Ammonium Sulfite and Substrate Formation by Mixed Fermentation

The obtained seriously contaminated condensate with an $NH_4^+$—N concentration of 4,000 mg/l and a temperature of 70° C. is used for flue gas desulfurization to obtain the ammonium sulfite, which is used as the digestion liquid in ammonium sulfite method in Step 2) for digestion.

The method for flue gas desulfurization is the method in the present invention, the steps of which are as follows: first, the flue gas is dedusted in the electrostatic cleaning device, and then pressurized in the draught fan; the flue gas is delivered into the Venturi tube, which is connected with the waste ammonia water tank; the mixture of the obtained seriously contaminated condensate and ammonia water is injected into the Venturi tube to absorb the sulfur dioxide, obtaining the mixed liquor of ammonium bisulfite.

The flue gas mixed liquor flowing out of the Venturi tube is delivered to the leaching pool at the bottom of the desulphurizing tower. Excessive amount of mixed liquor of seriously contaminated condensate and ammonia water is injected to react with the ammonium bisulfite to produce the ammonium sulfite.

In the leaching pool, an ammonia water mixture of ammonium bisulfite and ammonium sulfite is obtained. The mixed liquor is pumped to the higher position of the tower, and then ejected downward through the three-layer sprinkler at the middle of the tower. Then the liquor and the flue gas flowing upward are uniformly mixed. As a result, the residual sulfur dioxide in the flue gas is absorbed. The ammonium bisulfite in the mixed liquor reacts with the sulfur dioxide to produce ammonium sulfite, and then the liquor is delivered to the leaching pool. The steps are repeated until the sulfur dioxide in the flue gas is completely absorbed.

In addition, there is a fresh water sprinkler on the top of the tower, which is used for absorbing the ammonia escaping form the desulfuration process. The absorbed ammonia are returned into the leaching pool, and then added into the circulation of absorbing sulfur dioxide by the method of spraying.

There is a pH detector in desulphurizing tower. When the pH in the desulphurizing tower reaches 7.5, i.e. the equilibrium state is achieved between the ammonium sulfite and ammonium bisulfite, the liquor is discharged into the ammonium sulfite tank. After sedimentation, filtration, and purification, the liquor is delivered into the storage tank of ammonium sulfite, which will be used for pulping by ammonium sulfite method.

The exhaust gas, after fresh water absorption at the upper part of the desulphurizing tower, is vented from the tower top, and then delivered into an ammonia absorption tower through draught fan. In the ammonia absorption tower, the residual ammonia in the exhaust gas is absorbed by the fresh water to produce the diluted ammonia water, which will be delivered into the ammonia water tank. The concentration of the ammonia water is adjusted to 1%~2%. Then the ammonia water is delivered to the waste ammonia water tank. The sulfur dioxide in the flue gas are absorbed and reused. In addition, the waste ammonia water generated in other industries can be used in the waste ammonia water tank. After the concentration is adjusted to an acceptable level, the waste ammonia water will be used for exhaust gas absorption. The exhaust gas after absorption is vented, with the absorption rate of sulfur dioxide up to 99.5%.

The ammonium sulfite mixed liquor produced in the previous steps is used as the chemical for digestion in ammonium sulfite method in Step 2) of Embodiment 1, which will be added into the digester for the digestion and subsequent processes, forming the circulation.

Embodiment 10

The water treatment methods in this Embodiment include filtration, flocculation settling, biochemical treatment, and advanced treatment.

The flocculation settling is UPCB treatment.

The biochemical treatment is $QA^2O$ treatment.

The advanced treatment includes the regular precipitation separation steps.

The filtration is the micro-filtration, with the number of meshes being 80-120.

In addition, the steps for dewatering treatment of the sludge obtained in UPCB and $QA^2O$ are included.

Figure 3:
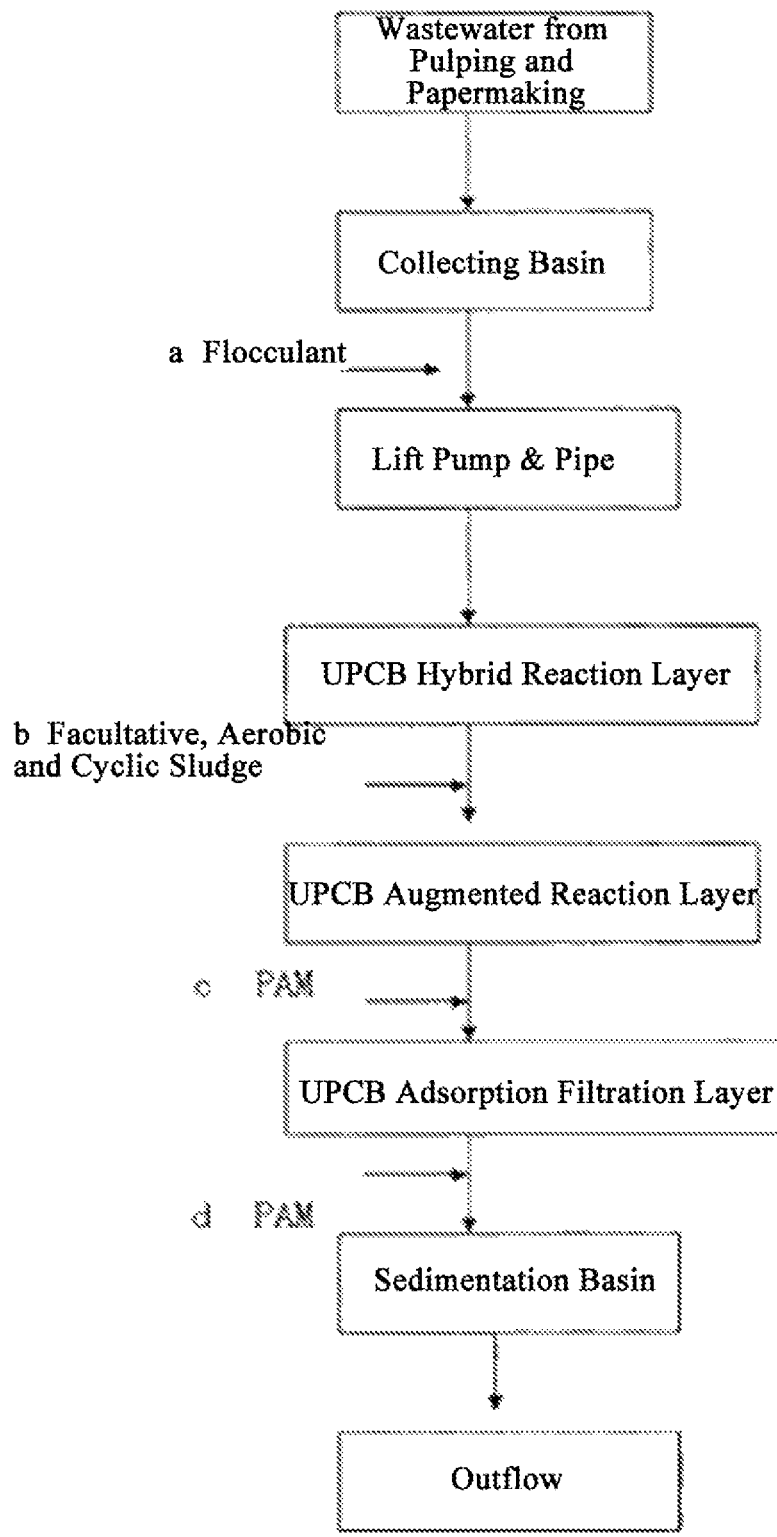
FIG. 3 illustrates the schematic view of UPCB treatment process in the method mentioned in Embodiment 10 of the present invention.
Figure 4:
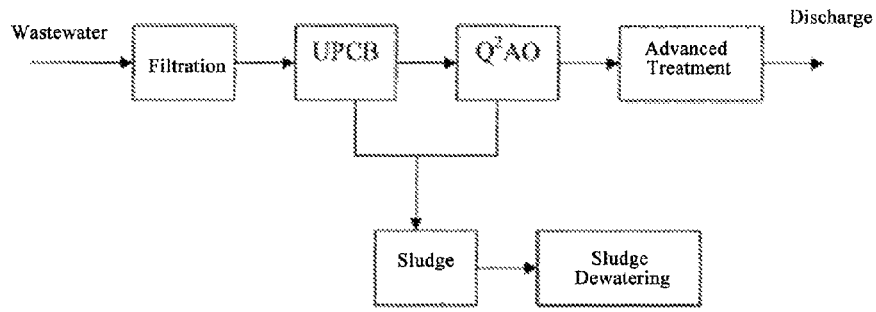
FIG. 4 illustrates the schematic view of papermaking wastewater treatment mentioned in Embodiment 10 of the present invention.
Figure 5:
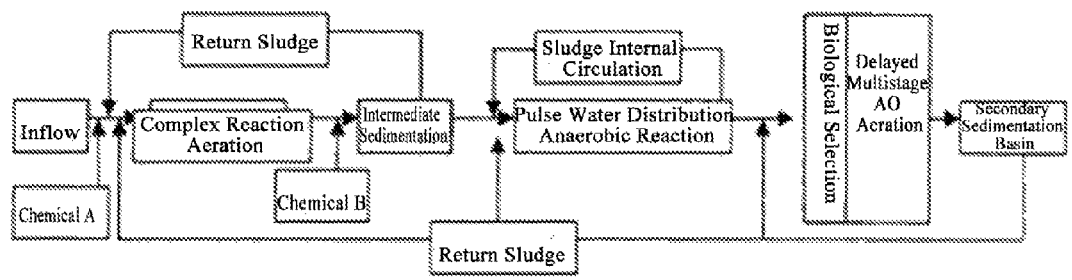
FIG. 5 illustrates the schematic view of $Q^2AO$ mentioned in Embodiment 10 of the present invention.
Figure 6:
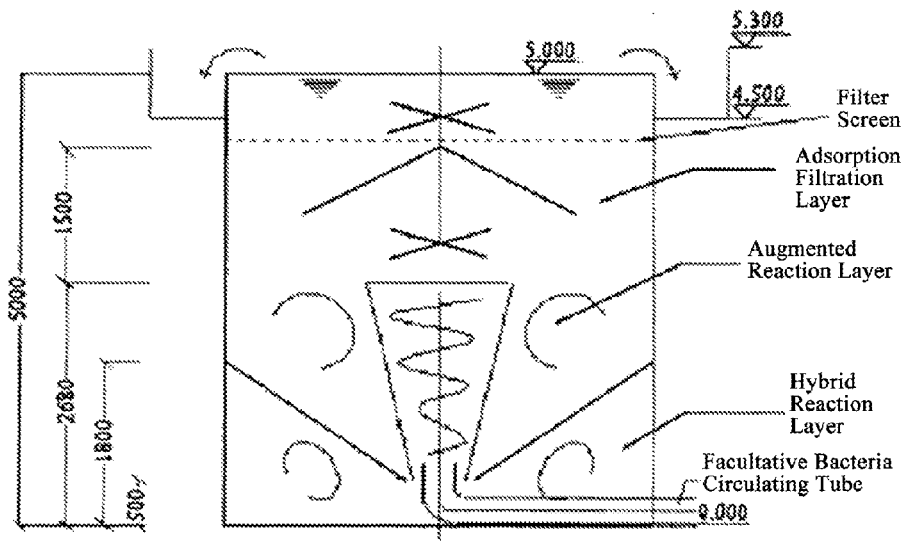
FIG. 6 and FIG. 7 illustrate the structural schematic views of UPCB reactors mentioned in Embodiment 10 of the present invention.
Figure 7:
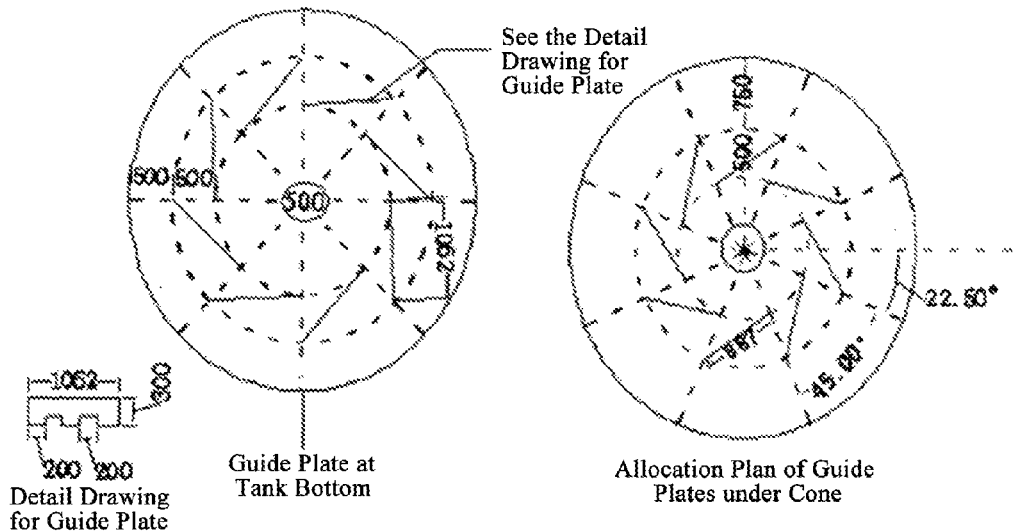
Figure 8:
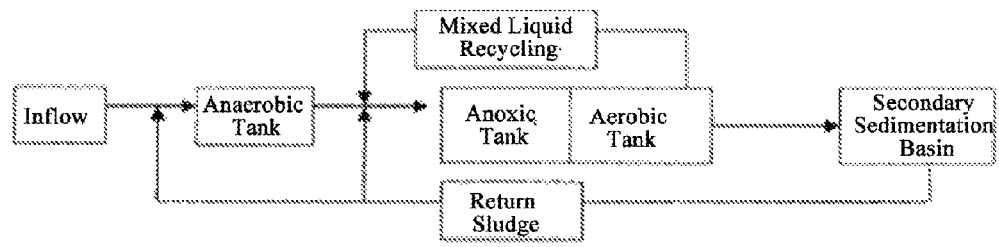
FIG. 8 illustrates the traditional A2O process.

For the questions mentioned above, the researchers of the present invention invent a process that integrates the advantages of vortex reactor, cyclone reactor and pore plate reactor, as well as integrates the sludge circulation technology, sludge contact filtration technology, and microorganism facultative and anaerobic decomposition. The detailed process flow is as follows:

Refer to FIG. 3. The wastewater in papermaking is first delivered into the collecting basin, into which the flocculants are added. The wastewater and the flocculants are intensively mixed by lift pump and pipe. Then the mixture is delivered into the hybrid reaction layer of UPCB reactor.

Preferably, the waster water is filtrated before entering the collecting basin, and sand riffled in the grit basin, so as to remove the sand, fiber, part of lignin, pigment, etc. The common treatment methods in the prior art are adopted for the filtration and sand riffling treatment in the grit basin, which can be suitably selected by the common technical personnel in the field according the requirements. In addition, all the selections are included in the scope of routine design, so no creative work is needed to be done.

After that, the facultative, aerobic and cyclic sludge is added at the boundary between the hybrid reaction layer and the augmented reaction layer, so the flocculation settling can be fully completed.

Then, the flocculants are added or not added into it. The coagulant aids are added into the water in sedimentation basin after the UPCB adsorption filtration layer, so that the flocculation settling can be more effectively completed, and the liquid supernatant is easier to separate.

As for dosing point a, the commonly used flocculants can be added. The flocculants can be suitably selected by the common technical personnel in the field according the requirements. The selection is obvious to the personnel, so no creative work is needed to be done. The flocculants include liquid flocculants (PAC, PAFC, PSAC, PSFAC, etc.).

The dosing point "a" is before the lift pump. The dosing concentration is 1-10%, with 3-6% preferred. There is no special limitation for the dosing method. The flocculants may be added by a fluoroplastic pump or inhaled by negative pressure before the pump.

After intensive mixing, the wastewater is delivered into the hybrid reaction layer of UPCB reactor.

The wastewater, with chemical mixed, enters the bottom of round UPCB reactor along the tangent, with an upward declination angle of 15-45°. The water in this region or within the entire reactor is kept in rotational flow status. According the need, such devices as cyclone reactor, mixed flow reactor, pore plate reactor, etc. can be equipped in this region, so that the rotational flow status can be kept.

The dosing point b is located at the boundary between the hybrid reaction layer and the augmented reaction layer. This point is on the central axis of the reactor, at where the anaerobic, facultative, aerobic and physicochemical flocculent sludge are added. There is no special limitation on the added sludge, as long as it can function as per the above description. According to the needs, the common technical personnel in the field can select the suitable sludge by the conventional technologies. The selection is obvious to personnel, so no creative work is needed to be done.

UPCB adsorption filtration layer is located at the upper part of the reactor, which mainly consists of outflow pipe, guide plate, doser, filter screen stirrer, etc. During operation, a layer of sludge filtration layer with a certain thickness is formed at the middle-upper part of this layer, which is in a semi-fluid status. It can capture large amount of small SS that do not form floc in augmented reaction area. Taking the filter screen as the dividing line, the part above the screen is the flow reaction area for sludge and water mixture, and the part below the screen is the filtrating area of suspended sludge with high concentration. The filter screen can be nylon, polyester or stainless steel screen, etc., with the number of meshes being 20-40. The thickness of the sludge layer varies with the sizes of the reactors. However, in the industrial process, in consideration of the general equipment size, the thickness of the sludge layer is generally 1-2 m generally.

Preferably, a dosing point d is added, at which more coagulant aids can be added, so that the floc is more dense and larger, and the water is clearer. The coagulant aids are the commonly used ones in the field. The common technical personnel in the field can determine the coagulant aids by simple tests. The dosage at this point is preferred to be 0.2-5 ppm.

In order to remove the sludge in the circulation more effectively, the hydraulic retention time is preferably controlled within 4-10 hours. When the retention time is too short, the biological effect is not clear; when it is too long, the sludge tends to float upward.

During the removal of SS and colloform in the reactor, the large particulate pollutants in the water are removed, and facultative, anaerobic, hydrolysis acidification reactions take place to a certain extent. So of necessary, the subsequent anaerobic, aerobic and other kind of treatments is much easier to perform. The effects of UPCB technology are shown in the following table:

| Index | Inflow mg/L | Outflow mg/L | Removal Rate % | Inflow mg/L | Outflow mg/L | Removal Rate % | Inflow mg/L | Outflow mg/L | Removal Rate % |
|---|---|---|---|---|---|---|---|---|---|
| | | Jul. 10, 2007 | | | Nov. 10, 2007 | | | May 10, 2008 | |
| COD | 3488 | 1970 | 43.5 | 3620 | 1962 | 45.8 | 3485 | 1840 | 47.2 |
| B0D$_5$ | 1046 | 610 | 41.7 | 1190 | 667 | 43.9 | 1110 | 607 | 45.3 |
| SS | 2350 | 230 | 90.2 | 2380 | 240 | 89.9 | 2260 | 200 | 91.2 |

By the wastewater treatment method in the present invention, the recycling rate of the wastewater is over 60%.

QA$^2$O mainly consists of three stages, i.e. A1, A2 and O, but it varies largely from the conventional A$^2$O process. A1, A2 and O are separately set up, and the stages are respectively A1 (complex reaction aeration basin), A2 (pulse water distribution upward flow anaerobic reactor), and O (delayed multistage AO aeration basin). The process has a strong ability of removing pollutants such as SS, COD, BOD, etc. The conventional A$^2$O sludge circulation extends through the entire process. Massive circulation of aerobic tank mixed liquor takes place in Stage A2 and Stage O, with the purpose of nitrogen and phosphorus removal.

From the two flow charts, we can see that there are relatively large differences between QA$^2$O process and conventional A$^2$O process. In conventional A$^2$O process, the sludge is circulated in the three stages, i.e. A1, A2 and O; there is no intermediate sedimentation basin in the middle; there is a mixed liquor circulation between Stage A2 and Stage O; in the three stages, A1 is anaerobic, A2 is facultative, and O is aerobic. In QA$^2$O process, Stage A1 mainly adopts the facultative bacteria, meanwhile conforms to the physicochemical reactions. The sedimentation basin is separately built for this stage, so is the sludge circulation system; Stage A2 mainly adopts the facultative bacteria obligatory anaerobic bacteria, so it is a completely anaerobic process; Stage A2 has its independent mixed liquor circulation system, so it does not depend on Stage A1 and Stage O sludge recycle; Stage O mainly adopts the aerobic bacteria; in Stage O, the cascade of multiple oxygen enrichment stages and oxygen deficit stages (i.e. multistage AO) is realized by the alternative oxygen supply of the aeration equipment; in addition, a biological selection basin is built before Stage O, so as to optimize the strains.

The process mainly has the five functions: SS removal, nitrogen removal, phosphorous removal, biodegradability enhancement, and COD & BOD degradation.

(1) Stage A1 takes SS removal as the main task, meanwhile triggers the nitration reaction denitrification, and realizes the nitrogen and phosphorus removal (refer to the part of complex reaction aeration basin for details).

(2) Stage A2 takes anaerobic digestion as the main task, meanwhile decomposes some macromolecule organic matters into micromolecule organic matters, enhances the removal rate of subsequent Stage O, and realizes the release of phosphorus (refer to the part of pulse water distribution upward flow anaerobic reactor for details).

(3) Stage O give full play to the aerobic bacteria, meanwhile realizes the multistage AO alternation, and makes the microorganisms more active so as to achieve a relatively high removal rate. In addition, long term operation under delayed low loads produces large amount of aerobic granular sludge.

The reactor in question has the following features:

1 It is not a triphase separator. This is one of the largest differences between this anaerobic reactor and the conventional reactor. By relatively large diameter/height ratio (5:1), the flow rate of the wastewater is reduced, so the purpose of solid-liquid separation is realized.

2 The pulse water distribution system is adopted. With the help of siphoning, A1 outflow stored in the water distributor for 3~5 minutes is discharged to the basin bottom with repaid flow rate in a short time (within twenty seconds). Then the sludge at the basin bottom is stirred upward to produce the suspension status. Therefore, the sludge and water are intensively mixed, so that the efficiency of anaerobic reaction is ensured.

3 It is especially suitable for (but not limited to) the mid-phase wastewater in the wheat straw chemical pulp. It has a good pertinence to cellulose, hemicellulose, polysaccharide, reducing sugar, coating wastewater modified starch in coating wastewater, part of lignin, and its derivatives in wastewater, etc. It gives full play to hydrolytic acidification in decomposes these macromolecule into micromolecule, creating a good environment for aerobic treatment.

4 The anaerobic bacteria are the granular sludge and flocculent sludge. The conventional anaerobic bacteria, due to the undersized diameters and the high flow rate, cause the serious loss of flocculent sludge, and regard the cultivation of granular anaerobic sludge as the main purpose. However, this reactor permits the coexistence of granular sludge and flocculent sludge, and enables them to simultaneously function, so as to achieve higher removal effect, and meanwhile enhance ss removal capability.

5 The treatment capacity of a single basin is high. The large diameter-length ratio significantly enhances the treatment capacity of a single basin.

In the process of this Embodiment: the average COD in the mid-phase raw water is 3,800 mg/L, and after the treatment by the system, the average COD in UPCB outflow is 1,900 mg/L, the average COD in A1 is 1,280 mg/L, the average COD in A2 outflow is 730 mg/L, the average COD in secondary sedimentation basin outflow is 85 mg/L, and SS is less than 50 mg/L.

By utilization of physiochemical and aerobic biochemical treatment methods in the prior art, the COD in the raw water is about 2,500 mg/L. For physiochemical treatment, the amount of flocculants PAC is 800 ppm, and that of PAM is 5 ppm, and the COD in the outflow is about 1,850 mg/L. For aerobic biochemical treatment, when the hydraulic retention time is 96 hours, the COD in the outflow is about 350 mg/L.

From the above descriptions, we can conclude that the treatment cost of the prior art is higher than that of the process mentioned in this Embodiment, and the outflow is not stable and can not reach the standards.

Embodiment 11

The water treatment methods in this Embodiment include filtration, sand riffling, flocculation settling, the separation and recycling.

In the filtration step in the present invention, the conventional filtration technologies in the prior art can be used to remove sand, fiber, part of lignin, pigment, etc., remove large amount of suspended solids (SS), and meanwhile recycle the pulp.

Preferably, the rotary microstrainer is adopted for filtration. The steel mesh or nylon mesh with a mesh number of 80-120 is adopted. Preferably, the recycled pulp is concentrated to 2% (by weight) and then returned into the pulping system. The SS in the filtrated wastewater is controlled within 800 mg/L.

There are sands in the filtrated wastewater. In order to reduce recycling cost, enhance the quality of recycling water, and ensure the normal operation of the subsequent equipment, preferably the sand removal is performed for the wastewater. The commonly used sand removal methods in the prior art can be used.

Generally, grit basin is selected for sand riffling. The intermittent sand discharge is performed at the bottom, and the flocculation settling is carried out for the liquid supernatant.

For different recycling waters, i.e. middle stages with different concentrations and impurity contents, the total amount of flocculants is the one with which the impurities can be settled. The common technical personnel in the field can determine the amount of flocculants by simple tests.

However, in this Embodiment, preferably, the total amount of flocculants is 300-800 ppm of the weight of the recycling water to be treated.

Since the salt contents of the wastewater produced in different stages of pulping are different, in the present invention, preferably, the wastewater is separated into high salt content wastewater and low salt content wastewater, and only the low salt content wastewater is collected. The conventional steps of filtration, sand riffling and flocculation settling are used to remove sand, fiber, part of lignin, pigment, etc., so that the wastewater can reach the discharge or recycling standards.

In the present invention, the flocculation settling consists of two steps: first, 10-30% (by weight) of the flocculants is added into the recycling water; 70-90% of the flocculants is desalinized; then the desalinized floc is added into the recycling water to be treated so as to complete the flocculation settling.

The desalination includes: making the flocculants flocculate in the fresh water, and collecting the floc as the flocculants in the flocculation settling step.

The other desalination includes: making the flocculants flocculate in the recycling water to be treated, collecting the floc; performing the acidification and anaerobic treatment of the floc. The acidification and anaerobic treatment can be performed by the conventional technologies in the prior art, which is obvious to the common technical personnel in the field. To be specific, it includes delivering the floc into the acidification pool, controlling the temperature within 25-45° C., controlling the retention time within 8-12 hours, and cultivating the acid-producing bacteria; meanwhile controlling the solid-liquid separation, i.e. realizing the separation in a sedimentation basin or concentration basin. After acidification, the floc is delivered into the anaerobic system to perform the acidification, so as to ensure the best performance of the acid-producing bacteria; meanwhile, ensure the backflow stirring strength, ensure the intensive mixing and flow of strains, avoid the generation of granular sludge, and control the hydraulic retention time within 20-36 hours, so as to facilitate the regeneration of the floc; then the regenerated floc are recollected to be used as the flocculants in flocculation settling.

Preferably, in the present invention, the regeneration is performed in the floc concentration of 3-5% (by weight). After the regeneration is completed, the pH is within 6-6.5.

In the present invention, there is no special limitation on the flocculants to be used. For example, the ferro-aluminium compound salt flocculants in the prior art can be used.

In order to achieve better effect of flocculation settling, the coagulant aids can be added. Similarly, there is no special limitation on the use of coagulant aids. For example, the commonly used polyacrylamide coagulant aids can be selected. There is no special limitation on the dosage, which can be suitably selected by the common technical personnel in the field according the requirements.

However, preferably, the dosage of the coagulant aids is 1-6 ppm of the weight of the wastewater to be treated. The performing time of the coagulant aids is preferably 1-3 minutes, with 2 minutes more preferable.

In the flocculation settling, preferably, first 10-30% of flocculants (by weight) are added into the recycling water to initiate the flocculation settling in recycling water. The dosing point GT is controlled in the range of 106-108, where G is the velocity gradient, while T is the stirring time. The time for hybrid reaction is 2-8 minutes, with 4-6 minutes preferred, and 5 minutes most preferable. Then the floc which is desalinated and retextured is added to continue the flocculation settling. GT is controlled in the range of 105-106, and the time for hybrid reaction is 5-15 minutes, with 6-10 minutes preferred, and 8 minutes most preferable.

In this Embodiment, preferably, settling lasts for 2-12 hours in the sedimentation basin, with 4-8 hours preferable. The supernatant water is directly discharged or recycled. 30-50% of the precipitate is regenerated, i.e. the hydrolytic acidification and anaerobic treatment are performed, so as to obtain the floc for recycling water treatment, which will be used as the flocculants in settling. By the recycling water treatment method in the present invention, the recycling rate of the mid-phase reaches 70-80%.

Figure 9:
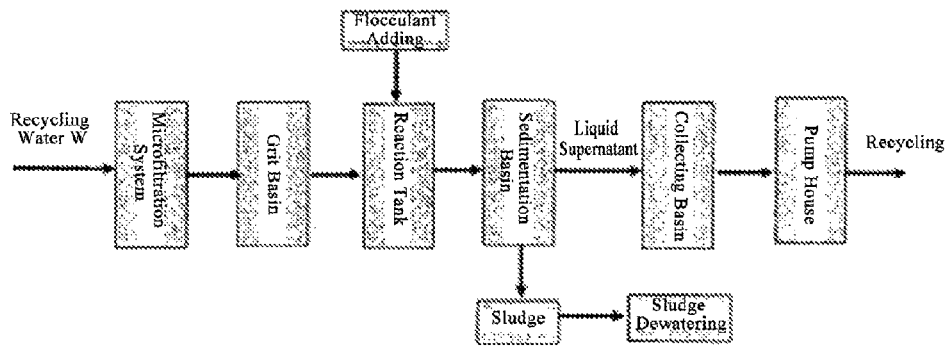
FIG. 9 illustrates the schematic view of treatment method of recycling water recycling mentioned in Embodiment 11 of the present invention.

In FIG. 9, the recycling water W is filtrated in the filtration section, and sand riffled in the grit basin, so as to remove the sand, fiber, part of lignin, pigment, etc. The common treatment methods in the prior art are adopted for the filtration and sand riffling treatment in the grit basin, which can be suitably selected by the common technical personnel in the field according the requirements. In addition, all the selections are included in the scope of routine design, so no creative work is needed to be done.

Then the treated recycling water is delivered into the reaction tank, at where it is first undergone the flocculation settling with part of the flocculants (say 10-30% by weight). Then the remaining desalinized floc is added to perform the flocculation settling, so as to ensure the thorough flocculation settling.

In this Embodiment, 100% desalinized floc can be selected as the flocculants to perform the flocculation settling. The dosage of the flocculants and the flocculation settling process is same as or similar to those in the desalination for of part of the flocculants mentioned above. The common technical personnel in the field can realize that just by simple tests.

Preferably, the coagulant aids are added into the recycling water, so that the flocculation settling can be more effectively completed, and the liquid supernatant is easier to separate.

After the thorough flocculation settling, the treated recycling water is delivered into the sedimentation basin to separate the sludge. The liquid supernatant is collected in the collecting basin and recycled to the papermaking section. The changes in the features of the wastewater before and after the recycling water recycling system are shown in the following table:

From the table, we can see that the system can effectively remove COD and SS in the wastewater, with the COD removal rate over 58%, and SS removal rate over 85%. In addition, the system operation is stable, and there is nearly no fluctuation in the outflow quality, which ensure the quality of the recycle water.

| Monitoring Time | Monitoring Item | COD (mg/L) | SS (mg/L) |
|---|---|---|---|
| 2007 Dec. 14 Morning | Inflow | 3526 | 2318 |
| | Outflow | 1421 | 260 |
| | Removal rate | 59.7% | 88.8% |
| 2007 Dec 14 Afternoon | Inflow | 3551 | 2430 |
| | Outflow | 1430 | 250 |
| | Removal rate | 59.7% | 89.7% |
| 2007 Dec. 15 Morning | Inflow | 3433 | 2442 |
| | Outflow | 1418 | 240 |
| | Removal rate | 58.7% | 90.2% |
| 2007 Dec. 15 Afternoon | Inflow | 3550 | 2314 |
| | Outflow | 1427 | 230 |
| | Removal rate | 59.8% | 90.1% |

The invention claimed is:

1. A circular utilization method in pulping and papermaking processes with straw, wherein the method comprises the following steps:
   (1) among raw materials from farm planting, greenhouse planting and garden, selecting straw raw material that is suitable for pulping, obtaining straw raw material for pulping through stock preparation, obtaining a pulp with a hardness of Kappa number 24-50 by digestion, then obtaining pulp by extruding and washing, performing post-treatment for pulp to obtain paper pulp, and manufacturing paper product;
   (2) extracting a black liquor during extruding and washing the pulp with a hardness of Kappa number 24-50, and obtaining a concentrated black liquor by evaporation and concentration, which is used as a first fertilizer for circularly returning to farm planting, greenhouse planting and garden for utilization;
   (3) generating ammonium sulfite by mixing a contaminated condensate obtained by evaporation and concentration of the black liquor with gas desulfurization, and circularly using the ammonium sulfite in digestion;
   (4) in step (1), obtaining a waste after stock preparation, mixing the waste with the contaminated condensate, obtaining a second fertilizer by fermentation, returning the second fertilizer to farm planting, greenhouse planting and garden for utilization, which can result in the circular availability of straw raw material;
   (5) using recycled water from mid-phase water processing in corresponding phases in a whole pulping process,
   the mid-phase water processing including filtration, flocculation settling, biochemical treatment, and advanced treatment,
   the advanced treatment including a precipitation separation step;
   the flocculation settling being performed by up-flow physical and chemical bed (UPCB) treatment;
   the UPCB treatment including: at first a wastewater mixed with flocculants being introduced into a hybrid reaction layer of a UPCB reactor; then facultative, aerobic and cyclic sludge being added into the wastewater at a boundary between the hybrid reaction layer and an augmented reaction layer; after the reaction in the augmented reaction layer, flocculants being added or not added into the wastewater, and the wastewater being delivered into an adsorption filtration layer in UPCB;
   the post-treatment including defibering and oxygen delignification;
   wherein the wastewater mixed with the flocculants enters a bottom of the UPCB reactor along a tangent, with an upward declination angle of 15-45°; and
   a hydraulic retention time is controlled within 4-10 hours.

2. The method according to claim 1, wherein
crop byproduct from farm planting, greenhouse planting, garden and/or organic waste are put into the circulation in step (4), and mixed with
the contaminated condensate, and
the second fertilizer is obtained by the method of fermentation, and is returned to farm planting, greenhouse planting and garden to form the circulation.

3. The method according to claim 1, wherein
the paper pulp for making paper products is an unbleached pulp.

4. The method according to claim 1, wherein
the contaminated condensate includes a first contaminated condensate with a $NH_4^+$—N concentration being larger than 0 and smaller than 1,000 mg/l, and/or a second contaminated condensate with a $NH_4^+$—N concentration being 4000 mg/l~5000 mg/l;
and a temperature of the contaminated condensate is 25~70° C.

5. The method according to claim 4, wherein the contaminated condensate is the second contaminated condensate.

6. The method according to claim 4, wherein the $NH_4^+$—N concentration of the second contaminated condensate is 4000 mg/l~4500 mg/l.

7. The method according to claim 4, wherein the temperature of the contaminated condensate is 50~70° C.

8. The method according to claim 1, wherein the fermentation for producing the second fertilizer includes the following steps:
1) the contaminated condensate or ammonium sulfite obtained by absorbing flue gas being mixed with crop byproduct or organic waste, the ratio of mass percentage of carbon to mass percentage of nitrogen in the mixture being adjusted to 15~30:1 to obtain a mixture before fermentation; pH value of the mixture before fermentation being 9.5~10;
2) the mixture before fermentation in step 1) fermenting spontaneously to get a fermented mixture;
3) the fermentation being completed and the second fertilizer being obtained, when the ratio of mass percentage of carbon to mass percentage of nitrogen in the fermented mixture in step 2) is within the range of 15~30:1, and pH is within the range of 6.5~8.5.

9. The method according to claim 1, wherein
the gas desulfurization comprises that flue gas is dedusted, and then delivered into a desulphurizing tower; and the contaminated condensate is introduced via pipeline to absorb $SO_2$ in the flue gas so as to obtain $(NH_4)_2SO_3$ for digestion in ammonium sulfite method.

10. The method according to claim 9, wherein, a process of the gas desulfurization includes the following steps:
1) desulfurization being performed for the flue gas by contaminated condensate, the flue gas being from industrial coal, a venturi tube being equipped ahead of the desulphurizing tower for the desulfurization, and the venturi tube being equipped with sprinkler and connected to the bottom of the desulphurizing tower;
the dedusted flue gas entering the venturi tube, where it mixes with a mixed liquor of contaminated condensate and ammonia water via the sprinkler in the venturi tube;
then the mixed liquor and the flue gas entering the desulphurizing tower again for desulfurization; and 2) ammonium sulfite solution mixture after desulfurization being used in pulping by the ammonium sulfite method in papermaking, and the ammonium sulfite solution having a concentration of 10%-35% and a purity of 80%-99%.

11. The method according to claim 1, wherein
the paper pulp is an unbleached pulp, which has a fracture length of 4.0-7.5 km, a folding number of 30-120 times, a tearing strength of 230-280 mN, and a whiteness of 35-65% ISO.

12. The method according to claim 11, wherein the unbleached pulp has a whiteness of 43-55% ISO, a fracture length of 5-7.2 km, a tearing strength of 200-300 mN, a folding number of 40-90 times, and a beating degree of 28-35° SR.

13. The method according to claim 1, wherein
the wastewater and the flocculants are mixed by lift pump and pipe before the wastewater enters into the hybrid reaction layer of UPCB;
a coagulant aid is added into the wastewater, and an amount of the coagulant aid is 0.2-5 ppm of the total weight of the wastewater, the filtration is micro-filtration, with the number of meshes being 80-120.

14. The method according to claim 1, wherein
in the flocculation settling, at first 10-30% of flocculants by weight are added into the recycled water to initiate the flocculation settling in recycled water; GT is controlled in the range of $10^6$-$10^8$ at dosing point, and the time for hybrid reaction is 2-8 minutes;
then a floc which is desalinated and retextured is added to continue the flocculation settling;
GT is controlled in the range of $10^5$-$10^6$, and the time for hybrid reaction is 5-15 minutes,
wherein G is a velocity gradient, T is a stirring time, and GT means G×T.

15. The method according to claim 14, wherein coagulant aids are added into water after flocculation settling, and the amount of the coagulant aids is 1-6 ppm of the weight of the recycled water to be processed.

16. The method according to claim 1, wherein,
the biochemical treatment is $QA^2O$ treatment, and $QA^2O$ consists of stage A1, stage A2 and stage O;
stage A1 is complex reaction aeration basin, stage A2 is pulse water distribution upward flow anaerobic reactor, and stage O is delayed multistage AO aeration basin;
wherein, in the $QA^2O$ treatment,
stage A1 adopts the facultative bacteria, meanwhile combining with the physicochemical reactions; a sedimentation basin is separately built for this stage, so is the sludge circulation system;
stage A2 adopts the facultative bacteria obligatory anaerobic bacteria, so it is a completely anaerobic process; stage A2 has its independent mixed liquor circulation system, so it does not depend on stage A1 and stage O sludge recycle;
stage O adopts the aerobic bacteria; in stage O, a cascade of multiple oxygen enrichment stages and oxygen deficit stages is realized by alternative oxygen supply of the aeration equipment;
in addition, a biological selection basin is built before stage O, so as to optimize the strains.

* * * * *